US010744540B2

(12) United States Patent
Lo et al.

(10) Patent No.: US 10,744,540 B2
(45) Date of Patent: Aug. 18, 2020

(54) REVERSING COFFEE-RING EFFECT BY LASER-INDUCED DIFFERENTIAL EVAPORATION

(71) Applicant: The Regents of the University of California, Oakland, CA (US)

(72) Inventors: Yu-Hwa Lo, San Diego, CA (US); Tony Minghung Yen, San Ramon, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/383,059

(22) Filed: Apr. 12, 2019

(65) Prior Publication Data

US 2019/0314872 A1 Oct. 17, 2019

Related U.S. Application Data

(60) Provisional application No. 62/656,922, filed on Apr. 12, 2018.

(51) Int. Cl.
*B08B 7/00* (2006.01)
*B01D 1/00* (2006.01)
*H01S 3/223* (2006.01)

(52) U.S. Cl.
CPC .......... *B08B 7/0042* (2013.01); *B01D 1/0029* (2013.01); *B01D 1/0082* (2013.01); *H01S 3/2232* (2013.01)

(58) Field of Classification Search
CPC .. B01D 1/0029; B01D 1/0082; B08B 7/0042; H01S 3/2232
See application file for complete search history.

(56) References Cited

U.S. PATENT DOCUMENTS 8,398,227 B2 * 3/2013 Akedo ................ H05K 3/1208 347/101
9,265,136 B2 * 2/2016 Hori ...................... H01S 3/2308
2005/0018036 A1 * 1/2005 Barron .................. A61B 18/20 347/224
2005/0118338 A1 * 6/2005 Stebe .................... B41M 3/006 427/331
2005/0153344 A1 * 7/2005 Diamond ........... G01N 33/6803 435/6.11
2008/0036810 A1 * 2/2008 Dixon .................... B41J 2/2132 347/15

(Continued)

*Primary Examiner* — Jonathan Miller
(74) *Attorney, Agent, or Firm* — Perkins Coie LLP

(57) ABSTRACT

Disclosed are methods, devices and systems to cause differential evaporation of micro-droplets in a scalable fashion. In some embodiments, an attenuated laser is used to focus an attenuated laser power to the center of an aqueous solution droplet, producing a differential evaporative flux profile that is peaked at the droplet apex. The laser-induced differential evaporation described herein is a breakthrough in the enrichment and focused deposition of water-soluble molecules such as nucleic acids, proteins, inks, and other small molecules. Disclosed is a general solution to remove the “coffee-ring effect”, ubiquitous in the drying process of aqueous droplets that causes many adverse outcomes. The disclosed techniques enable new paradigms in liquid biopsy combinational analysis, microarray fabrication, and ink-jet printing.

20 Claims, 20 Drawing Sheets

(56) References Cited

U.S. PATENT DOCUMENTS

| | | | | |
|---|---|---|---|---|
| 2010/0302319 | A1* | 12/2010 | Akedo | H05K 3/1208 347/54 |
| 2012/0307851 | A1* | 12/2012 | Hori | H01S 3/2308 372/27 |
| 2013/0101753 | A1* | 4/2013 | Eral | G01N 1/4022 427/541 |
| 2014/0284001 | A1* | 9/2014 | Amstad | F26B 3/12 159/4.01 |
| 2016/0271513 | A1* | 9/2016 | Weitz | B01D 1/18 |

* cited by examiner

B

| Method: | Differential Evaporation | | Hot Plate | |
|---|---|---|---|---|
| n | Pattern Size(μm) | Capture Ratio (%) | Pattern Size (μm) | Capture Ratio (%) |
| 1 | 101.88 | 75.63 | 1434.51 | 0.31 |
| 2 | 102.41 | 70.33 | 1736.25 | 0.23 |
| 3 | 100.82 | 82.34 | 1456.42 | 0.32 |
| 4 | 99.67 | 73.28 | 1292.41 | 0.33 |
| 5 | 100.99 | 68.05 | 1571.28 | 0.32 |
| 6 | 99.05 | 69.64 | 1534.67 | 0.33 |
| Average | 100.80 | 73.21 | 1504.26 | 0.31 |
| Standard Deviation | 1.28 | 5.23 | 149.18 | 0.04 |

TABLE 1

| Distance to Lens (mm) | Power (mW) | Beam Size (µm) |
|---|---|---|
| 45 | 160 | 60.00 |
| 45.5 | 125 | 48.19 |
| 46 | 70 | 28.93 |
| 46.5 | 104 | 40.16 |
| 47 | 181 | 69.39 |

TABLE 2

FIG. 9

REVERSING COFFEE-RING EFFECT BY LASER-INDUCED DIFFERENTIAL EVAPORATION

CROSS-REFERENCE TO RELATED APPLICATION

This patent document claims priority to and benefits of U.S. Provisional Patent Application No. 62/656,922, entitled "REVERSING COFFEE-RING EFFECT BY LASER-INDUCED DIFFERENTIAL EVAPORATION," filed on Apr. 12, 2018. The entire content of the above patent application is incorporated by reference as part of the disclosure of this patent document.

TECHNICAL FIELD

The present document is related to inducing evaporation of droplets.

BACKGROUND

The drying of a droplet of water carrying colloidal particles naturally gives rise to non-homogenous deposition pattern, with most of particles migrating to the edge of the droplet, forming the well-known "coffee-ring" deposition pattern. This non-uniform deposition has posed technical challenges in ink-jet printing, DNA/RNA and protein microarray manufacturing, and in combinational liquid biopsy analysis methods such as fluorescent microarray, infrared spectroscopy, and Raman spectroscopy, as well as other applications. New techniques are needed to eliminate the "coffee-ring effect" to increase the quality in printing, microarray fabrication and analysis, and in advancing liquid biopsy analysis sensitivity and accuracy.

SUMMARY

In one example aspect, an apparatus is disclosed. The apparatus is suitable for causing microdroplet evaporation. The apparatus includes a light source, a substrate to hold a microdroplet at a location, and a focusing module to focus the light source at an apex of the microdroplet, wherein a beam waist of the focused light source has a diameter less than a diameter of the microdroplet.

In another example aspect, a method of evaporating a microdroplet is disclosed. The method includes holding, by a substrate, a microdroplet at a location, illuminating, by a light source, the microdroplet, and focusing the light source at an apex of the microdroplet to cause a drying of the microdroplet, wherein a beam waist of the focused light source has a diameter less than a diameter of the microdroplet.

These, and other, aspects are described in greater details in the present document.

BRIEF DESCRIPTION OF THE DRAWINGS

FIG. 2C depicts an example table showing deposition pattern sizes and capture ratio vs. drying method, in accordance with some example embodiments;

FIG. 9 depicts an example table of observed beam size vs. distance to lens.

DETAILED DESCRIPTION

Figure 1A:
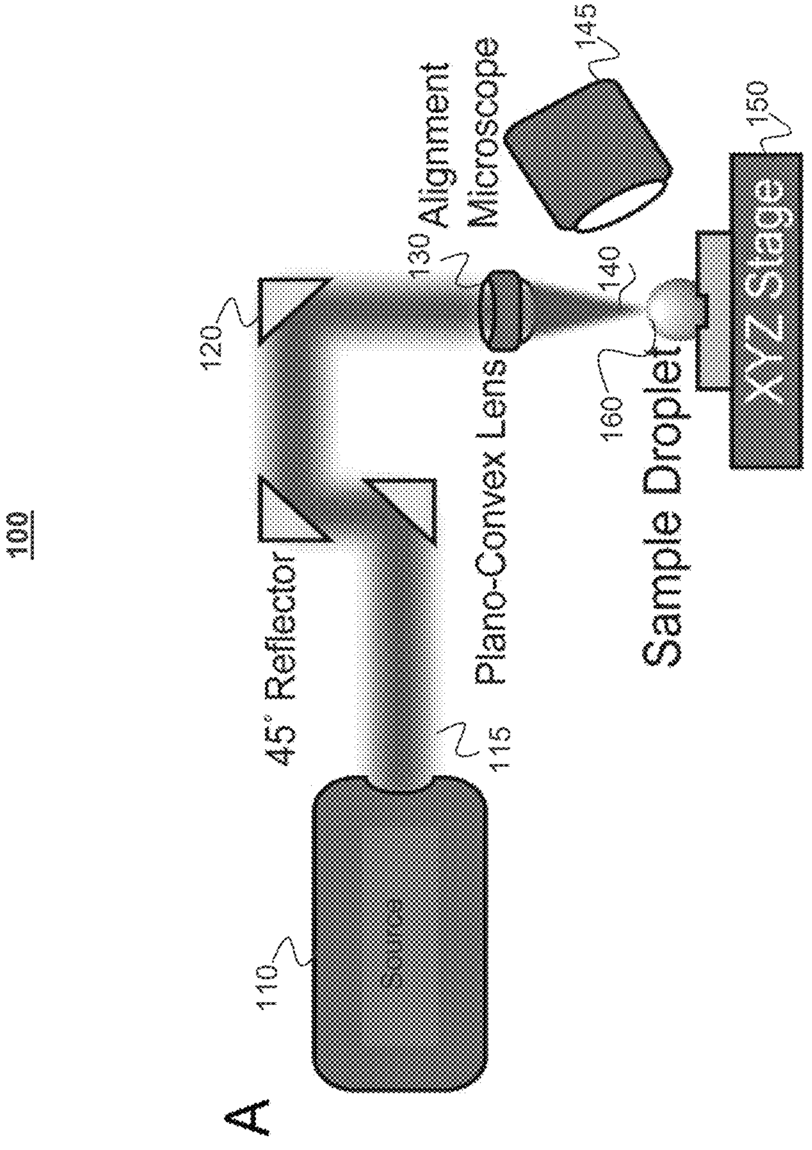
FIG. 1A depicts a laser and optics used to cause evaporation of a droplet, in accordance with some example embodiments.

Disclosed is a general solution to remove the "coffee-ring effect" (hereinafter, coffee-ring effect), ubiquitous in the drying process of aqueous droplets that causes many undesirable effects. Disclosed are methods, devices and systems to cause differential evaporation of micro-droplets in a scalable fashion. In some embodiments, an attenuated laser is used to focus laser power to the center of an aqueous solution droplet, producing a differential evaporative flux profile that is peaked at the droplet apex. The laser-induced differential evaporation described herein is a significant improvement in the deposition of water-soluble molecules such as nucleic acids, proteins, inks, and other small molecules. The disclosed techniques enable new paradigms in liquid biopsy combinational analysis, microarray fabrication, and ink-jet printing.

Reversing the coffee-ring effect which is ubiquitous in the drying process of aqueous droplets and causing many adverse effects enables new paradigms in liquid biopsy combinational analysis, microarray fabrication, and ink-jet printing. Part of this patent document describes the role of differential evaporation in the transition of a deposition pattern from a coffee-ring to a center peak pattern. To create the preferred differential evaporation for micro-droplets in a scalable fashion, a 10 W $CO_2$ laser may be used to focus 40 mW laser power to the center of the aqueous solution droplet, producing a differential evaporative flux profile peaked at the droplet apex. This differential evaporation flux profile then leads to an inward, radial flow that reverses the coffee-ring effect. This laser-induced differential evaporation method may be used on a fluorescent DNA solution to produce a shift in the deposition pattern, on a polystyrene beads solution to track internal fluidic flow, and on pure water to demonstrate the differential evaporation.

Reversing the coffee-ring effect in aqueous droplets enables controlled, microscale deposition of water-soluble molecules, which is important for many applications including liquid biopsy combinational analysis, microarray fabrication, and ink-jet printing. The disclosed method reverses the coffee-ring effect without using any surfactant or additive, thus providing minimal interference on downstream processes. As disclosed, a $CO_2$ laser beam may be focused to the center of aqueous solution droplet to generate differential evaporation, which leads to an inward, radial flow within the droplet and reverses the coffee-ring effect. Since the laser-induced differential evaporation process uses low power compared to the output of a compact $CO_2$ laser, the approach can be scaled up to support high throughput applications.

The drying of a droplet of water carrying colloidal particles naturally gives rise to non-homogenous deposition pattern, with most of the particles migrating to the edge of the droplet, forming the well-known coffee-ring deposition pattern. This non-uniform deposition has posed challenges in ink-jet printing, DNA/RNA and protein microarray manufacturing, and most recently in combinational liquid biopsy analysis methods such as fluorescent microarray, infrared spectroscopy, and Raman spectroscopy.

The cause of the coffee-ring effect is an outward, radial flow initiated by a weakly pinned contact line and maximum evaporation flux at the edge of the droplet. Thermally-induced Marangoni effect is effective in creating a re-circulation flow to reverse the coffee-ring effect, and to reduce the deposition pattern size of solution droplets with volatile solvents. However, when applied to aqueous droplets, the thermally-induced re-circulation flow is suppressed and the coffee-ring effect dominates the Marangoni effect. Electro-wetting is also effective in reducing the deposition pattern size of drying aqueous droplet but requires relatively high concentration (10 mM) of LiCl additive to adjust the solution's conductivity. To recover signals of diluted (100 nM to 100 aM) analyte from the dried LiCl solid crystal poses yet another technical challenge. To improve aqueous sample analysis from a drying droplet, one or more of the following are satisfied: reversing of coffee-ring effect, reduction in deposition pattern size, and minimal or preferably no additive to the solution.

The coffee-ring effect can be removed effectively provided there is a method to produce an environment that the evaporation rate at the apex of the droplet is much faster than the evaporation rate on surfaces elsewhere. The strong evaporation rate at the central region of the droplet will provide the needed driving force for the flow that suppresses the coffee-ring effect. Given the small size of the droplets in most applications, a $CO_2$ laser may be used to cause laser-induced differential evaporation. Water molecules have strong absorption (greater than 3000 cm-1) at 10.6 μm wavelength produced by a $CO_2$ laser. As such, a $CO_2$ laser will generate a differential evaporative flux profile on a water surface. Using the disclosed techniques, the laser-induced differential evaporation method has been used to reduce the deposition pattern size of aqueous solution droplets from 1.5 mm to a 100 μm spot without the addition of ionic salts or surfactants. The disclosed system and techniques are low-power (40 mW) and can be scaled up with parallel optical paths in an array format. In this way, many droplets can be evaporated at the same time (e.g., within 1 to 10 nanoseconds, or within one microsecond of each other). During droplet evaporation, the $CO_2$ laser beam creates maximum evaporative flux at the apex of the droplet, causing an inward, radial flow that dominates and counteracts the outward, radial flow of the coffee-ring effect. The inward flow occurs concurrently with contact line de-pinning and ultimately leads to the peak deposition patterns.

Figure 1B:
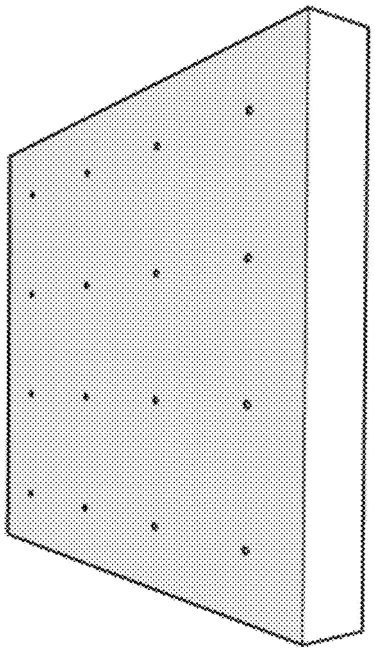
FIG. 1B depicts a coated microarray with a pattern, in accordance with some example embodiments.
Figure 1C:
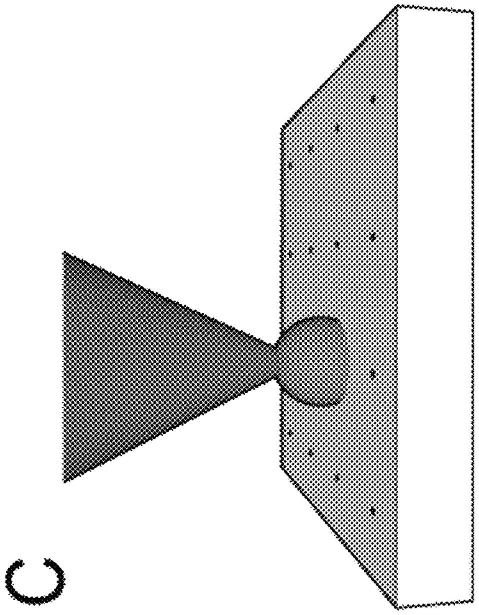
FIG. 1C depicts an example of a microarray allowing the laser system to continuously deposit biomolecules from solution droplets on an XY plane, in accordance with some example embodiments.

FIGS. 1A-1C depict an example of a system for differential evaporation, in accordance with some example embodiments. FIG. 1A depicts a light source 110 which can be a carbon dioxide laser producing beam 115 that is collimated through a beam expander (not shown), reflected at a 45° angle 3 times at 120, and attenuated 75% (attenuator not shown) to achieve top-down exposure of the plano-convex lens 130. Through the plano-convex lens 130, the laser beam converges to a focal point 140. Using an alignment microscope 145 and a XYZ linear stage 150, a sample droplet 160 is centered to the laser beam's focal point and a high evaporation flux occurs at the apex of the droplet. FIG. 1B depicts a cytop coated microarray with 4×4 100 μm patterns with 2 mm spacing. FIG. 1C depicts a microarray allowing the laser system to continuously deposit biomolecules from solution droplets on an XY plane.

The disclosed $CO_2$ laser system generates maximal evaporation flux difference on the droplet surface. To realize such effect, an example system focuses the $CO_2$ laser beam to a 28.9 μm spot on the glass substrate, which is the basal surface of the droplets. In the opto-mechanical and imaging setup 100 shown in FIG. 1A, the light source 110 can be a 10 W $CO_2$ laser (e.g., Universal Laser Systems ULR-10) with emission wavelength of 10.6 μm, beam size of 4 mm, and divergence of 5 milliradians (mrad). The laser power is modulated at a frequency of 20 kHz and duty cycle ranging from 0-100%. To achieve the desired size of the beam spot, the laser beam enters a 10× beam expander including a pair of plano-concave (with a focal length of 50 mm, for example and a diameter of 1") and plano-convex lens (with a focal length 500 mm, for example, and a of diameter 1"). The lenses may be made from zinc selenide (ZeSe) and have a broadband (7-12 μm) antireflective coating. The expanded laser beam with diameter of 40 mm is reflected three times at a 45° angle at 120 using gold-coated mirrors to allow the beam direction to change from parallel to perpendicular to the sample stage. Since differential evaporation requires much lower laser power (e.g., 40 mW) that the laser produces (e.g., 10 W), a piece of 22 mm glass circular coverslip can be fixed to the center of one of the gold-coated mirrors to achieve 75% attenuation. Other techniques can also be used to cause the desired attenuation. The laser beam then passes through a plano-convex 130 lens (with focal length 50 mm, for example, and a diameter 1") made using ZeSe that converges into a focal point. The position of the laser focal point is recorded using an alignment microscope 145 (e.g., Dino-Lite AM411T) mounted at a 30-40° angle from the sample stage.

To define the sites for sample enrichment and/or reactions (hybridization or binding) in an array format, the glass substrate may be coated with amorphous fluorocarbon polymer such as cytop with 100 μm-diameter $SiO_2$ wells. Since a cytop-coated surface is hydrophobic (100° in contact angle, 4.5 μm in thickness), the cytop microarray device surface is hydrophobic except the uncovered, 100 μm-diameter $SiO_2$ wells (43° in contact angle), as shown in FIG. 1B. The cytop coating encourages water droplets to de-pin from their surfaces while the hydrophilic well anchors the droplets onto the pattern throughout the drying process. A cytop microarray device can have dimensions of 8 mm by 8 mm and can have 4×4 100 μm well patterns spaced 2 mm apart. The microarray device may have other dimensions, well patterns, and/or spacings as well. During experimental operation, sample droplets may be spotted onto patterns using, for example, a syringe-pump droplet spotting system. To start the differential evaporation process, the laser is turned on at 40 mW and the laser beam is focused onto the spotted droplet (see, for example, FIG. 1C). As the sample droplet dries, the laser power is reduced sequentially to be approximately proportional to the 3rd power of the receding radius of the droplet.

To demonstrate the effect of laser-induced differential evaporation on biomolecule deposition, 1 μL droplets have been dried that contain 10 nM fluorescent ssDNA (single stranded FAM labeled DNA, with a length, for example, of 24 nts) using both laser-induced differential evaporation method and a hot plate setup. The hot plate method accelerated solution droplet evaporation by heating up droplets from the bottom liquid-solid contact.

Figure 2A:
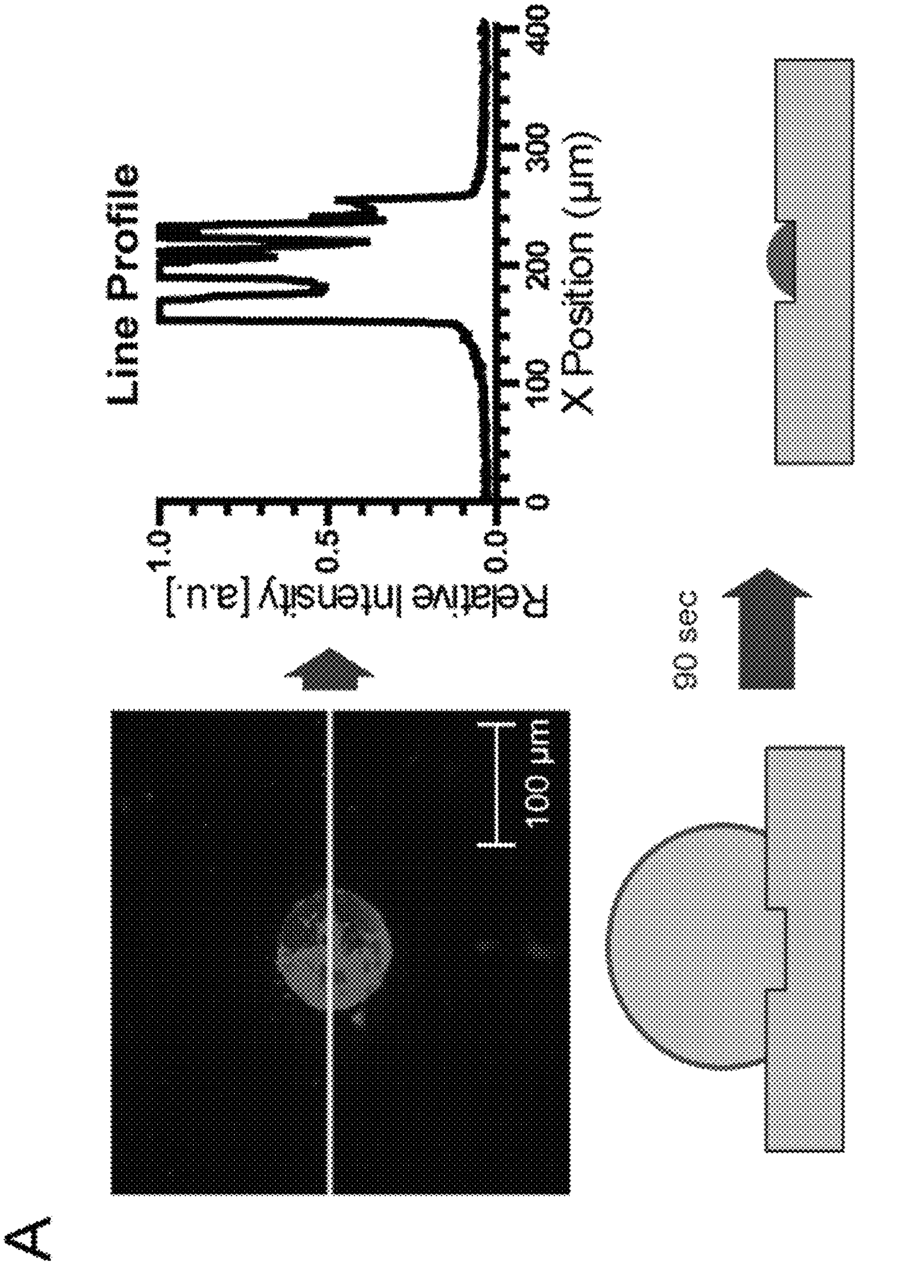
FIG. 2A depicts an example of an image and line profile comparison between fluorescent ssDNA (single-stranded DNA) molecule deposited on a microarray by laser heating, in accordance with some example embodiments.
Figure 2B:
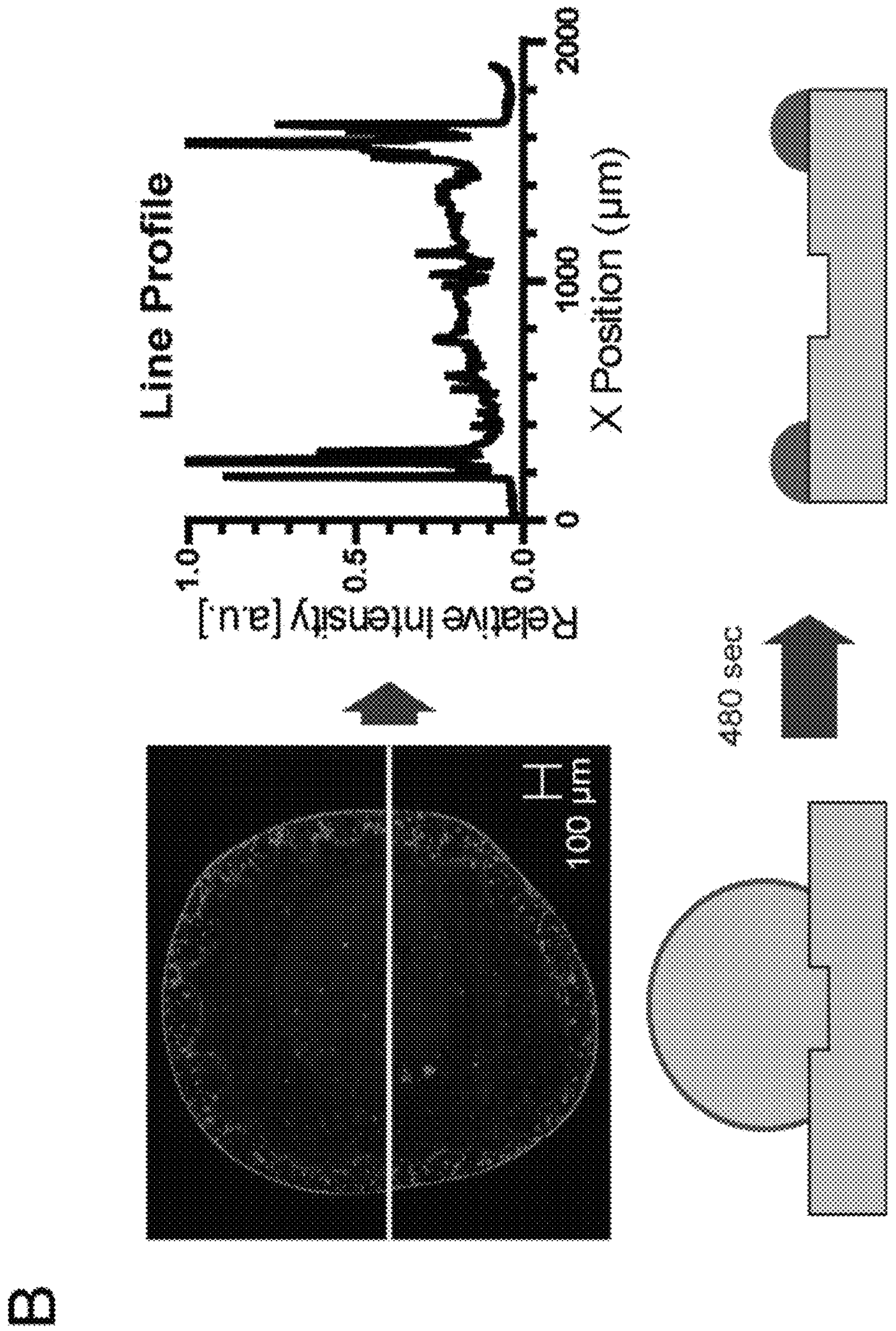
FIG. 2B depicts an example of an image and line profile comparison between fluorescent ssDNA molecule deposited on a microarray with hot plate heating showing a coffee-ring pattern, in accordance with some example embodiments.

FIGS. 2A-2B depict examples of image and line profile comparisons between fluorescent ssDNA (single-stranded DNA) molecule (FAM labeled, 24 base pairs in length) deposited on a cytop microarray by laser heating and hot plate heating (50 C). FIG. 2A depicts an example of differential evaporation by laser heating of DNA molecule deposition patterns confined within the 100 μm patterns. In some example embodiments, the average time for 1 μL of 10 nM solution droplet to dry is ~90 s. FIG. 2B depicts example hot plate heating results with a typical coffee-ring pattern, in which the DNA molecule dries in a ring structure (~1.5 mm) outside of the 100 μm patterns. In some example embodiments, the average time for 1 μL of 10 nM solution droplet to dry is ~480 s for a 50 C hot plate.

As noted above, FIGS. 2A-2B show fluorescent DNA deposition patterns on a cytop microarray device resulting from both the laser-induced method and the hot plate heating (50 C). The deposition patterns were imaged using an enclosed fluorescent microscope. For the differential evaporation method, fluorescent image and line profile analysis shows insignificant fluorescent signal outside of the 100 μm microarray pattern (FIG. 2A), indicating minimal liquid pinning event during drying and an absence of droplet edge-deposition. For the hot plate method, fluorescent image and line profile analysis show prominent fluorescent signal in a ring-structure with a diameter ~1.5 mm, indicating significant liquid pinning event during drying and droplet edge-deposition, the coffee-ring effect (FIG. 2B). In terms of overall evaporation rate, the differential evaporation method requires ~90 sec to dry 1 μL of the 10 nM solution droplet, and the hot plate heating requires ~480 sec for complete evaporation. With a 16×16 ZnSe microlens array with 1.5 mm pitch, the method can be extended to dry 256 droplets, or more, simultaneously with the compact $CO_2$ laser.

Despite sharing fluidic properties, bottom substrate surface material and geometry, and ambient environment conditions with the hot plate heating method, the differential evaporation method shows no coffee-ring deposition. FIG. 2C (Table 1) shows example results (n=6) of deposition pattern size and capture ratio from both differential evaporation and hot plate methods (1 μL of 10 nM fluorescent ssDNA). Pattern size quantifies the spread of the deposition pattern, and capture ratio measures the relative amount of fluorescent signal detected in the 100 μm pattern region compared to the total signal of the imaged surface. For the differential evaporation method, am example of repeating deposition testing yields an average drying pattern size of 100.8 μm, size standard deviation of 1.28 μm, and an average capture ratio of 73.21%, indicating that most fluorescent DNA molecules were deposited within the pattern. The capture ratio being less than 100% may be due to device background auto-fluorescence, background light scattering, or non-specific DNA surface adsorption. Nevertheless, in the case of coffee-ring deposition by hot plate heating, the average capture ratio is 0.31%. A low capture ratio, combined with an average pattern size of 1504 μm, indicates that most fluorescent DNA are deposited outside of the microarray 100 μm pattern. Both qualitative and quantitative analysis indicates differential evaporation causes a shift in the mode of deposition from the typical coffee-ring deposition.

Figure 3A:
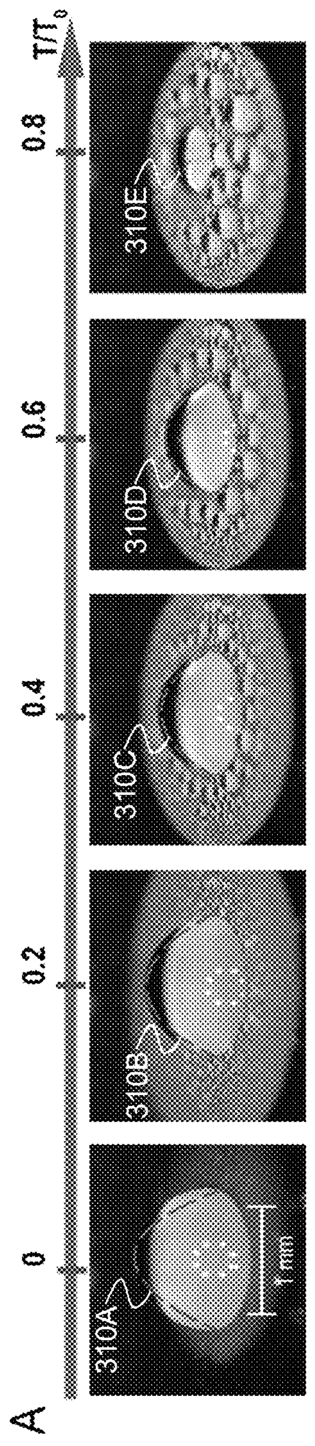
FIG. 3A depicts an example of a droplet undergoing differential evaporation, in accordance with some example embodiments.
Figure 3B:
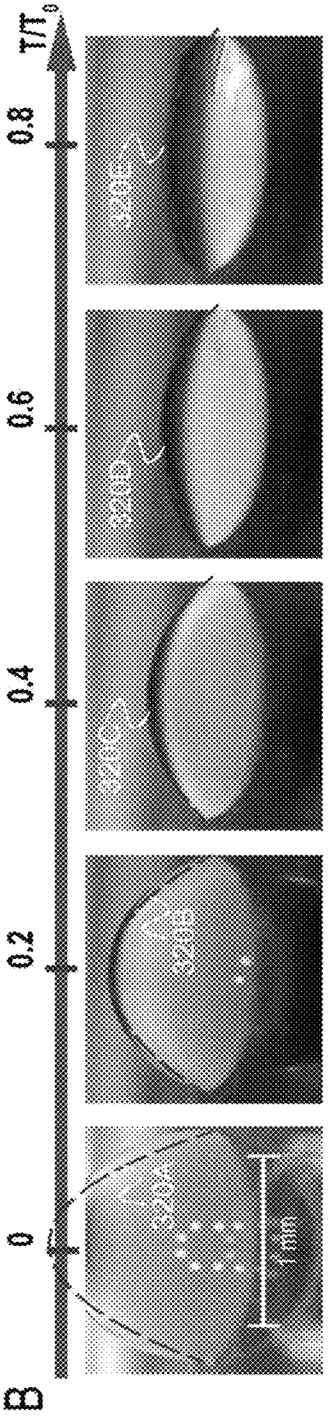
FIG. 3B depicts an example of a droplet undergoing evaporation due to a hot plate, in accordance with some example embodiments.
Figure 3C:
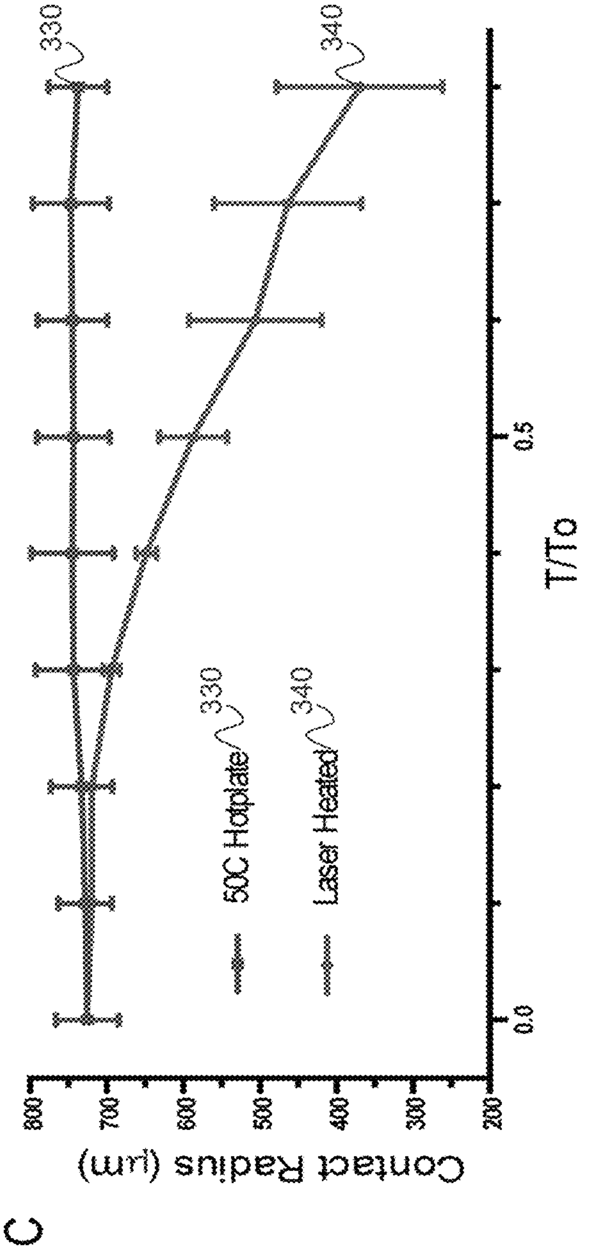
FIG. 3C depicts examples of contact radius time-evolution curves for differentially evaporated droplets and hot plate dried droplets, in accordance with some example embodiments.

To establish the physical connection between differential evaporation and the mode of biomolecule deposition, the mode of droplet evaporation during differential evaporation is determined. The mode of droplet evaporation characterizes the history of a droplet contact line position and contact angle. While there are two pure droplet evaporation modes, one with constant contact radius (CCR) and the another one with constant contact area (CCA), most aqueous droplet evaporation undergoes both pure modes as well as a mixture of the two modes where both contact area and contact radius are variable. The transition from the CCA mode to the CCR mode is related to pinning of the triple phase contact line. FIGS. 3A-3B shows the droplet evaporation mode during both differential evaporation and hot plate heating (50 C) on cytop microarray device (1 μL, of 10 nM fluorescent ssDNA). FIG. 3A depicts an example including 1 μL of 10 nM ssDNA droplet undergoing differential evaporation. The droplet shape is fitted at each time to a corresponding parabolic curve 310A-310E. As time progresses (progressing from 310A-310E), the droplet volume and contact radius shrinks due to water evaporation at droplet apex. Microdroplets condense around the heated droplet due to water vapor diffusion from active evaporation and temperature gradient of the relatively cooled bottom surface. FIG. 3B depicts an example including 1 μL of 10 nM ssDNA droplet heated by a 50 C hot plate. The droplet shapes are fitted at each time to a corresponding parabolic curve 320A-320E. As time progresses (progressing from 320A-320E), the droplet volume shrinks due to water evaporation from bottom hot plate heating. No surface condensation is observed since the solid surface is higher in temperature. FIG. 3C depicts an examples of contact radius time-evolution curves. Contact radius for differentially evaporated droplet continues to shrink with time, while hot plate dried droplets are pinned at their original position.

Droplet evaporation recordings reveal two differences between the two evaporation processes. One difference is the surface condensation on the cytop microarray during differential evaporation, forming micro-droplets around the original droplet, while hot plate heating is free of surface condensation (FIG. 3A). In the hot plate heating, the device surface temperature is elevated to 50 C relative to the ambient temperature (~20 C) and thus water vapor rapidly leaves the surface and diffuses into the ambient (FIG. 3B). On the other hand, during differential evaporation, the substrate surface is at ambient temperature, which may cause condensation of the hot vapor oversaturating the surrounding region. Another difference is contact line movement. During differential evaporation (FIG. 3C), the droplet contact line continues to de-pin from the cytop surface and moves toward the center, while hotplate heating results in a pinned contact line throughout droplet evaporation. The contact radius time-evolution curve shows a time-independent, constant contact radius of 750 μm for hot plate heating, matching the CCR mode of evaporation. In contrast, laser-induced differential evaporation results in a receding contact radius with time progression. Moreover, during the 0.4 to 0.8 $T/T_0$ time regime, the normalized contact radius receding rate is linear (i.e. $\dot{R}/R \sim Ct$), showing the characteristic of the CCA mode of evaporation. While the normalized contact angle rate for differential evaporation (i.e., $\dot{\theta}/\theta$) declines with time and essentially approaches zero, again showing the characteristic of the CCA mode of evaporation. Comparing between contact radius and contact angle data for the two processes, a shift from CCR to CCA evaporation mode is observed for the laser-induced differential evaporation method.

Figure 4A:
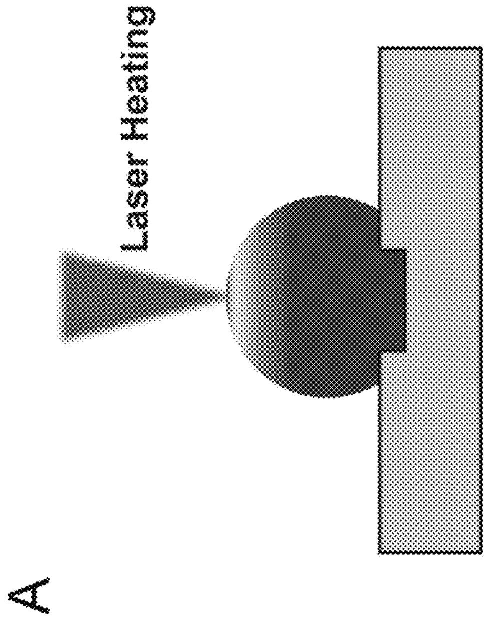
FIG. 4A depicts an example diagram showing laser heating at a droplet apex creating a temperature gradient and evaporation rate that is highest at the droplet apex and lowest at the droplet base, in accordance with some example embodiments.

The cause behind contact line pinning is a weakly pinned contact line and the suppression of thermally-induced flow, which leads to an outward, radial flow causing the coffee-ring effect. FIG. 4 shows liquid temperature isotherm, water evaporation flux distribution, and internal fluidic flow diagrams for both laser-induced differential evaporation and hot plate heating methods. The liquid isotherm diagram shows laser induced evaporation creates a temperature profile that is highest at droplet apex and lowest at droplet base (FIG. 4A). In contrast, hotplate heating creates a temperature profile with the highest temperature at droplet base (FIG. 4B).

Figure 4B:
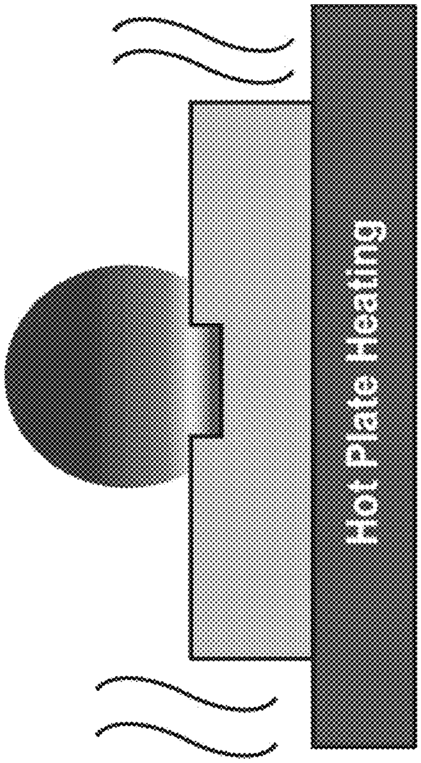
FIG. 4B depicts an example diagram showing hot plate heating at the droplet base creates a temperature gradient that is highest at the droplet base and lowest at the droplet apex, in accordance with some example embodiments.
Figure 4C:
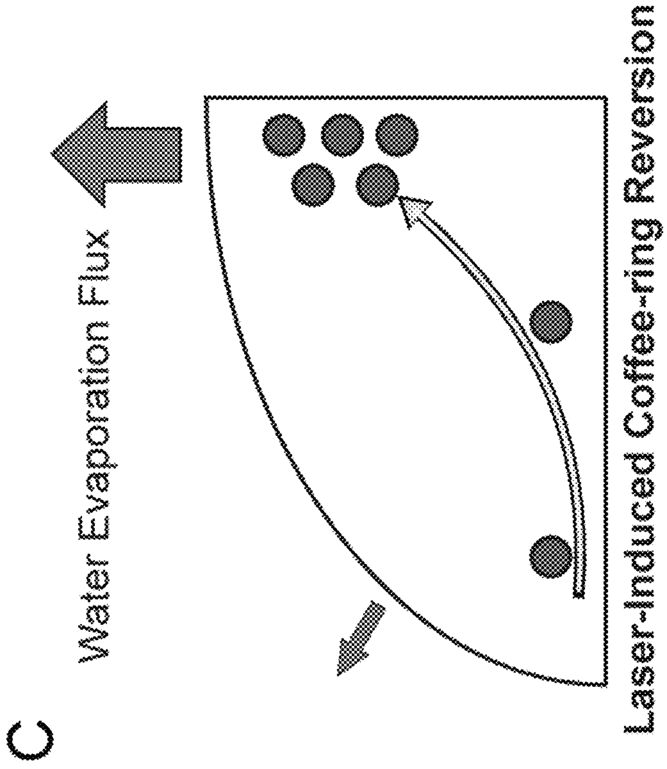
FIG. 4C depicts an example diagram showing that due to the surface laser heating on the droplet apex, water evaporation flux is highest at the droplet apex, in accordance with some example embodiments.
Figure 4D:
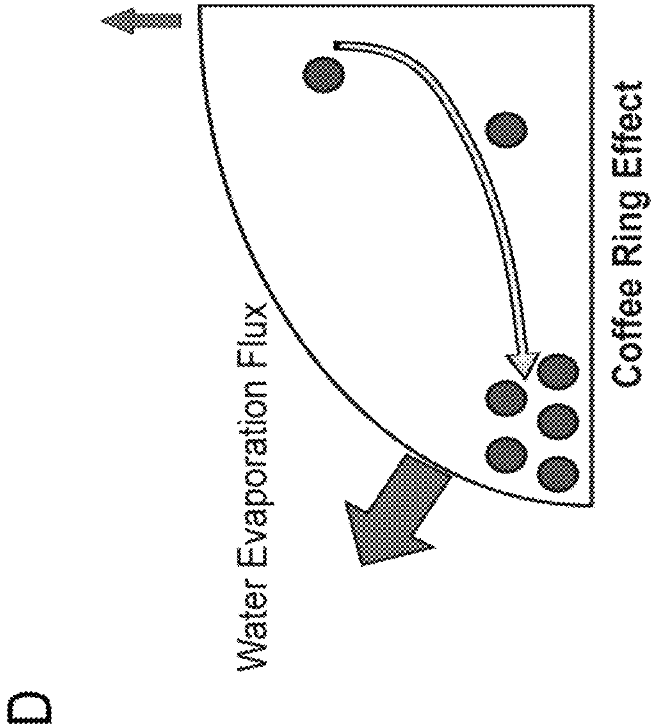
FIG. 4D depicts an example diagram showing that due to lower probability of water vapor reabsorption at droplet edge, water evaporation flux is highest at the droplet edge, in accordance with some example embodiments.

FIGS. 4A-4D depict thermal and water evaporation flux response to laser heating. FIG. 4A depicts laser heating at the droplet apex creating a temperature gradient and evaporation rate that is highest at droplet apex and lowest at droplet base. FIG. 4B depicts hot plate heating at the droplet base creating a temperature gradient that is highest at droplet base and lowest at droplet apex. FIG. 4C depicts, water evaporation flux is highest at the droplet apex due to the surface laser heating on the droplet apex. An internal flow develops to replenish the lost water volume at the apex, producing an inward, radial flow that carries colloidal particles to the droplet center and reverses the coffee-ring effect. FIG. 4D depicts water evaporation flux is highest at the droplet edge due to lower probability of water vapor reabsorption at droplet edge. Governed by the mass transport equation, an internal flow must be supplied to replenish the water loss at the edge. As a result, an outward, radial flow carries colloidal particles to the droplet edge, causing the coffee-ring effect.

To understand how laser heating leads to differential evaporation at the droplet's surface, the relation between water evaporation flux J* and interface quantities via the Hertz-Knudsen expression from kinetic theory of gas, $$J^* = \alpha\sqrt{\frac{M}{2\pi \bar{R} T^*_{sat}}}\,[p^*_{sat}(T^*_i) - p^*_v],$$

where $p_{sat}^*(T_i^*)$ is the saturation pressure at the interface temperature $T_i^*$, $T_{sat}^*$ is the saturation temperature, $p_v^*$ is the vapor pressure just beyond the interface, and R is the universal gas constant. The parameters α and M are the accommodation coefficient (measure of liquid volatility) and the molecular mass of vapor respectively. For most practical cases, the coefficients α, M, $\bar{R}$, and $T_{sat}^*$ can be considered nearly constant throughout the process of droplet evaporation. For laser induced differential evaporation in FIG. 4C, J* reaches maximum at the droplet apex because surface temperature maximum yields maximum $[p_{sat}^*(T_i^*) - p_v^*]$. Moreover, $p_v^*$ is much lower than $p_{sat}^*(T_i^*)$ above the droplet apex because the laser beam also heats up the water vapor just beyond the droplet apex surface to drive the vapor away. The combined effect of elevated surface saturation pressure and removal of external water vapor gives rise to the laser-induced differential evaporation phenomenon. Based on the equation of mass transport, the strong water evaporation flux at the droplet apex leads to an inward, radial flow toward the droplet center, carrying colloidal particles toward the center of droplet. For the hot plate heating analysis in FIG. 4D, local evaporation rate diverges and reaches maximum at the droplet edge because of lower probability of water vapor reabsorption at droplet edge. Therefore, an outward, radial flow develops, carrying the colloidal particles to the droplet edge to produce the coffee-ring effect.

To support the forgoing explanation, the local saturation pressure and droplet internal flow direction may be experimentally verified. Since there is no direct method to assess the local saturation pressure surrounding the droplet, the droplet surface temperature is recorded to extrapolate the saturation pressure at the surface. For example, the droplet surface temperature is imaged using a microbolometer (FLIR A655sc) at a resolution of 640×480 pixels and at 25 μm spatial resolution. To measure the internal fluid flow, polystyrene micro-beads are added to the solution to track their motions from recorded images.

Figure 5A:
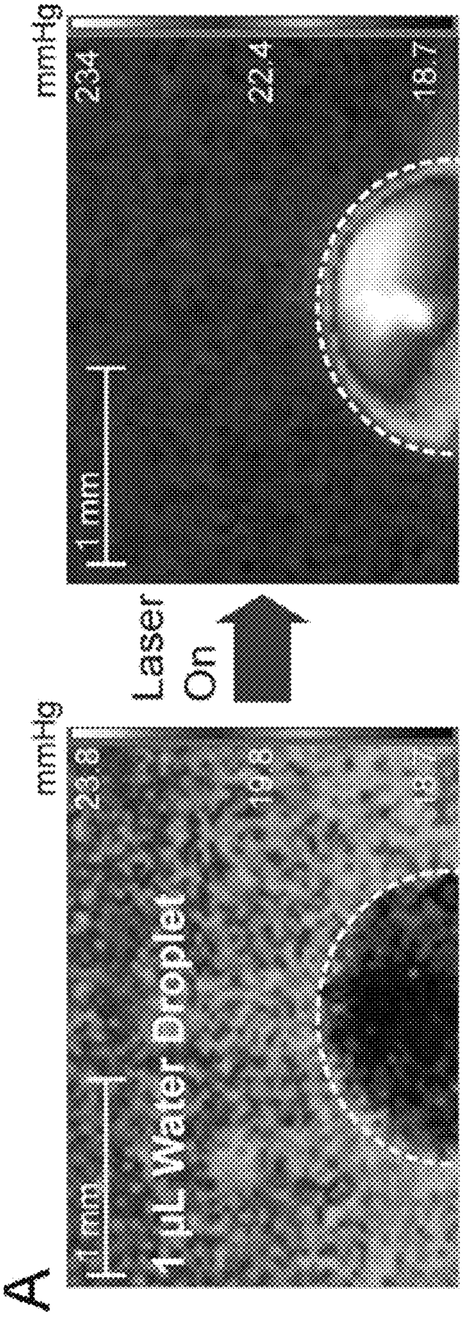
FIG. 5A depicts an example of surface water vapor saturation pressure and droplet internal flow tracking by polystyrene beads from laser-induced differential evaporation for a 1 μL water droplet, in accordance with some example embodiments.
Figure 5B:
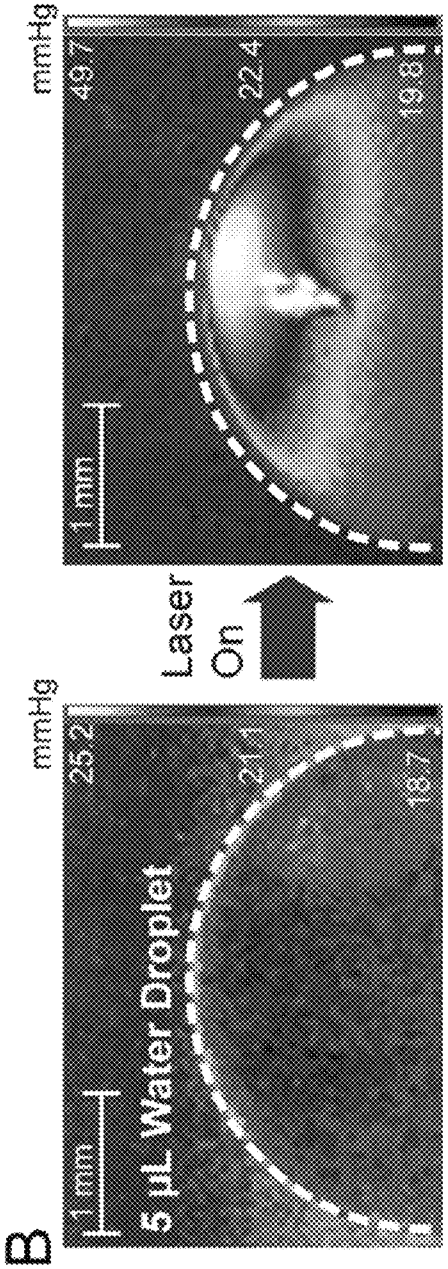
FIG. 5B depicts an example of surface water vapor saturation pressure and droplet internal flow tracking by polystyrene beads from laser-induced differential evaporation for a 5 μL droplet, in accordance with some example embodiments.
Figure 5C:
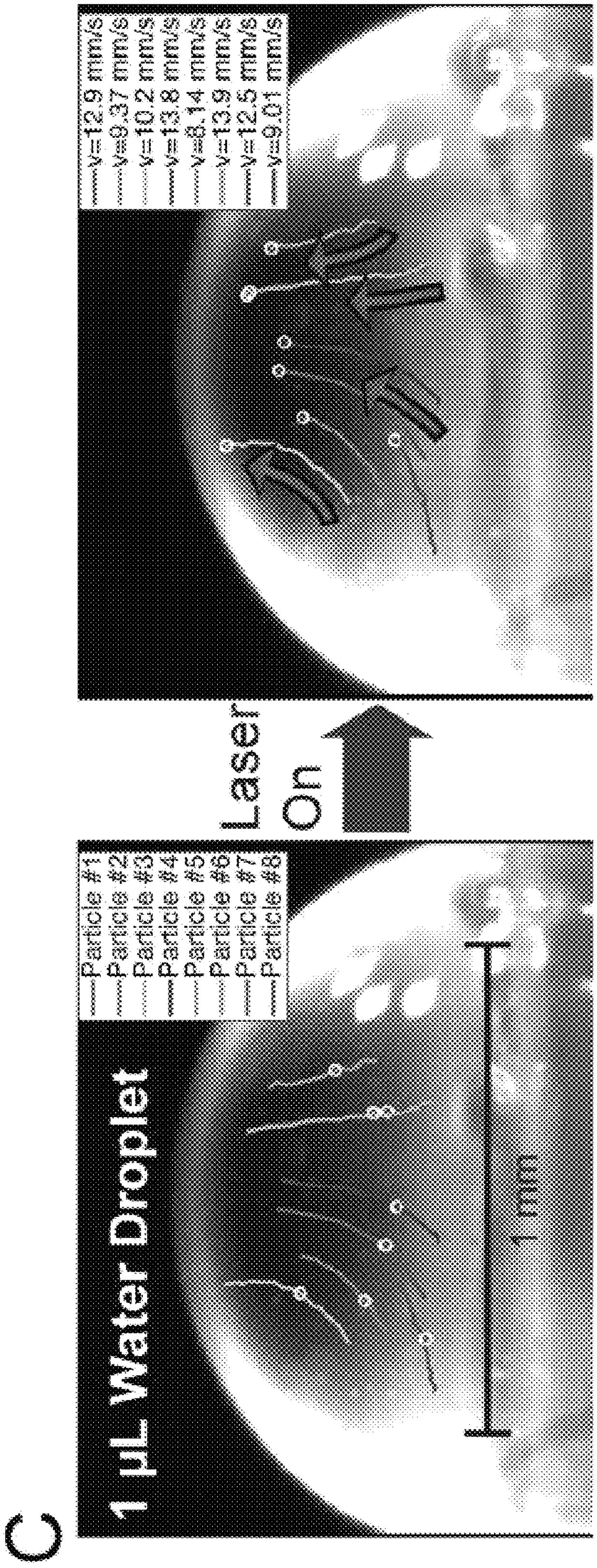
FIG. 5C depicts an example of polystyrene micro-bead movement tracking during a 33 ms timeframe showing upward, centripetal fluidic flow, in accordance with some example embodiments.

FIGS. 5A-5C depict surface water vapor saturation pressure and droplet internal flow tracking by polystyrene beads from laser-induced differential evaporation. FIG. 5A depicts laser-induced differential evaporation (40 mW) on 1 μL water droplet yielding a saturation pressure of 234 mmHg on the droplet apex surface. FIG. 5B depicts laser-induced differential evaporation (40 mW) on a 5 μL droplet yielding a saturation pressure of 49.7 mmHg on the droplet apex surface. Oversaturated spots in (A) and (B) are artifacts caused by reflections of the IR laser. FIG. 5C depicts polystyrene micro-beads (3.3 μm in diameter, 800 beads/μL in water) movement tracking during a 33 ms timeframe shows upward, centripetal fluidic flow with a mean velocity of 11.2 mm/s toward the droplet apex in the 1 μL droplet.

As noted above, FIGS. 5A-5D shows surface water vapor saturation pressure and polystyrene bead movement during laser-induced differential evaporation. Two volumes of water droplet (5 μL and 1 μL) are imaged to demonstrate the direct effect of laser beam size on surface water vapor saturation pressure (FIGS. 5A-B). The laser beam diameter is ~100 μm and ~60 μm respectively on 5 μL (~2 mm of liquid height) and 1 μL (~0.85 mm of liquid height) water droplet apex. Under the same laser power of 40 mW, the 100 μm and 60 μm laser beam diameters correspond to saturation pressure of 234 mmHg and 49.7 mmHg on droplet apex. This observation correlates to different progression during the differential evaporation process. As the droplet size reduces, surface saturation pressure increases at droplet apex. Tracking the internal microfluidic flow, the polystyrene bead solution droplets are imaged at 30 frames per second (FIG. 5C). The polystyrene beads are 3.3 μm in diameter and suspended in water at the concentration of 800 beads/μL. The bead positions were analyzed and overlaid onto the original images using a custom MATLAB program. During a timeframe of 33 ms, beads starting at the centric positions (#1,4,6,7) moves toward the apex with a mean velocity of 13.3 mm/s while the edge positions (#2,3,5,8) have a mean velocity of 9.18 mm/s, suggesting strongest flow at droplet center. Overall, polystyrene micro-beads migrate toward the droplet apex at a mean velocity of 11.2 mm/s, in agreement with the proposed coffee-ring reversion flow profile.

To elucidate experimental results of laser-induced differential evaporation and to support the qualitative arguments how the proposed method can remove the coffee-ring effect, a physical model to connect differential evaporation to coffee-ring effect reversion is described below. The following two conditions are approximately satisfied:

$$\text{Droplet height profile: } h(r,t) = H(t)\left[1 - \frac{r^2}{R^2(t)}\right], \quad \text{Equation (1)}$$

$$\text{Overall evaporation rate: } \dot{V} = \dot{V}_o\left(\frac{R(t)}{R_o}\right). \quad \text{Equation (2)}$$

In Equation (1), the droplet height profile h(r,t) follows a parabolic curve described by its center height H(t) and contact radius R(t) at time t. Equation (2) describes how the evaporation rate $\dot{V}$ is related to the initial evaporation rate $\dot{V}_o$ with R(t) and $R_o$ being the droplet contact radius at time t and time 0. FIG. 3A-B shows the parabolic curve fit to droplet shape during both laser-induced evaporation and hot plate drying. After initial 30% of drying time progression, parabolic curves fit droplet shapes, showing Equation (1) is accurate for $T/T_0>0.3$. During the laser-heating process, after initial 30% of drying time progression, the evaporation rate is proportional to contact radius and independent of contact angle, and thus Equation (2) is accurate for $T/T_0>0.3$.

The solvent mass conservation equation can be expressed as:

$$\frac{d}{dt}\int_0^r dr' 2\pi r' h(r',t) = -2\pi r v(r,t) h(r,t) - \int_0^r dr' 2\pi r' J(r',t), \quad \text{Equation (3)}$$

where v(r,t) denotes the height-average fluid velocity and J(r,t) denotes the local solvent evaporation rate per unit area (Vol/s-area). The sign of the velocity is positive for fluid leaving the center and negative towards the center. The following profile for J(r,t) may be used:

$$J(r,t) = -\frac{\dot{V}_o}{\pi R_o R(t)}. \quad \text{Equation (4)}$$

To describe laser-induced differential evaporation, J(r,t) in Equation (4) may be modified as $J(r,t)=J_i+J_d$, where $J_i$ is the evaporation rate due to isothermal evaporation because of laser heating, and $J_d$ is the differential evaporation by the focused laser beam. From the measured temperature profile of the droplet under the focused $CO_2$ laser beam and the fact that laser-induced evaporation dries the droplet 10 times faster than the uniformly heated droplet to 50 C by a hot plate, $J_d>>J_i$.

$$J(r,t) \sim J_i \cong 0 \text{ if } r > a \quad \text{Equation (5)}$$
$$J(r,t) \sim J_d = \frac{P}{a^2} \text{ if } r < a.$$

In this expression, laser-induced evaporation rate P(t) and laser exposure radius a. P(t) has the unit of vol/s and is proportional to the droplet surface temperature in the laser irradiated area and to the laser power. Substituting Equation (5) into Equation (3) and expanding each individual term, the following relation may be obtained:

$$2\pi r H(t) v = -\frac{\pi r^2 \dot{H}}{2}\left[1 + \frac{1}{\left(1 - \frac{r^2}{R^2}\right)}\right] + \pi r^2 H \frac{\dot{R}}{R}\left[1 - \frac{1}{\left(1 - \frac{r^2}{R^2}\right)}\right] - \frac{P}{\left[1 - \frac{r^2}{R^2}\right]}, \quad \text{Equation (6)}$$

where $\dot{H}$ is the time derivative of droplet center height. Utilizing Onsager's principle 22, $$\frac{\partial(\Phi + \dot{F})}{\partial \dot{R}} = 0,$$

Equations (1), (2), and (6), and the assumption that the droplet volume decreases much faster than the equilibration of the contact angle ($K_{ev}>>1$), the rate of contact radius movement $\dot{R}$ can be approximated as:

$$\dot{R} \sim \frac{R\dot{V}}{4(1+k_{cl})V} + \frac{RP}{4V(1+k_{cl})}\left(1 + \frac{1}{C}\right), \quad \text{Equation (7)}$$

where $k_{cl}$ denotes the ratio of contact line friction to hydrodynamic friction and $C=[-\ln(\in)-1]$. ∈ is a small number introduced to avoid singularity and is defined as $$\epsilon = \lim_{r \to (1-10^{-6})R}\left(1 - \frac{r^2}{R^2}\right).$$

In the analysis, it may be assumed that $k_{cl}$ is a time-independent material parameter that is determined by the droplet and the substrate. To analyze the coffee-ring effect, where and when the solutes precipitate during the droplet evaporation process are found. It may be assumed that the solute moves at the same velocity as the fluid inside droplet before precipitation. $\tilde{r}(r_o, t)$ may be defined as the height-averaged position of a solute at time t with their initial radial position at $r_o$, and $(\dot{\tilde{r}})$ as its time derivative representing the speed of movement of the solute as the droplet evaporates. Based on the above assumption for $k_{cl}$ and from Equation (7), the following relation between the solute speed, solute position, and the state of the droplet under laser-induced evaporation may be obtained:

$$\frac{(\dot{\tilde{r}})}{\tilde{r}}(r_0, t) = -k_{cl}\frac{\dot{R}}{R} - \frac{P}{2\pi H}\left[\frac{1}{\tilde{r}^2} - \frac{1}{R^2}\left(1 + \frac{1}{C}\right)\right] \text{ for } \tilde{r} > a, \quad \text{Equation (8)}$$

The negative sign in front of the $$\frac{\dot{R}}{R}$$

term means that the solute with an initial position $r_o$ moves in the opposite direction to the droplet radius without laser induced evaporation (i.e. P=0). At the time $t_d$ when $\tilde{r}$=R, the solute precipitates at the edge of the droplet, revealing the coffee-ring effect. The greater is the coefficient $k_{cl}$ that is related to liquid viscosity and contact line friction, the more serious the coffee-ring effect becomes. However, when the laser-induced evaporation is set at an appropriate level (to be determined next), and provided the solute at position $r_o$ initially (t=0) precipitates at $t=t_d$ at droplet edge ($\tilde{r}(r_o,t_d)$=R), the velocity of solute $(\dot{\tilde{r}})$ $(r_o,t_d)$ can be in the same direction as $\dot{R}$ but at a higher magnitude, yielding a condition that contradicts the presumption that the solute precipitates at the edge of the droplet. Therefore, when the laser induced differential evaporation rate reaches an appropriate level, solute with its initial position $r_o$ will not precipitate at the edge of the droplet, thus removing the coffee-ring effect. A more detailed quantitative analysis is discussed next.

A comparison may be made between the physical model and experimental results. Since Equation (8) is a function of the laser-induced evaporation rate P(t), P(t) can be controlled to obtain the desired precipitation pattern of solute. A practical approach is to define a mathematical expression for the precipitation profile and find the required laser induced evaporation rate such that the resulting precipitation profile is bounded by the mathematical expression. From Equation (8), it can be found that without laser-induced evaporation, the position of the solute is related to the droplet radius as:

$$\tilde{r}(r_0, t) = r_0\left(\frac{R}{R_0}\right)^{-k_{cl}},$$

which will lead to the coffee-ring pattern as explained previously. To counter the coffee-ring effect, we introduce a parameter G>0 to alter the relation into (9) and use the laser power to control the value of G:

$$\tilde{r}(r_0, t) = r_0\left(\frac{R}{R_0}\right)^{-[k_{cl}-G]}, \quad \text{Equation (9)}$$

To overcome the coffee-ring effect, G needs to be of sufficient strength such that $G>k_{cl}+1.27$. From Equations (8) and (9) and the criterion for G, we show that P(t) needs to satisfy the following criterion:

$$P(t) > -GR\dot{R}(2\pi H) = \frac{G\theta}{2}\left|\frac{d}{dt}\left(\frac{2\pi R^3}{3}\right)\right|. \quad \text{Equation (10)}$$

To obtain the last expression of Equation (10), the relation that the contact angle $$\theta \sim \frac{2H}{R}$$

is time independent for the CCA mode is applied. The term $$\left|\frac{d}{dt}\left(\frac{2\pi R^3}{3}\right)\right|$$

is the rate of change of the volume of "hypothetical half dome" of the droplet even though the actual shape of the evaporation droplet is not semi-spherical.

The result suggests that by controlling the laser power according to Equation (10), the solute precipitation behaviors will be within the bound of Equation (9). During our laser-heating process, laser power was gradually decreased from 40 to 0 mW over the 90 second drying period, as suggested by Equation (10).

Assuming the amount of solute initially present between ro and ro+dro is later on precipitated between $\tilde{r}$ and $\tilde{r}$+d$\tilde{r}$, we then have the relation $2\pi\O_o h(r_o)r_o dr_o=2\pi u(\tilde{r})\tilde{r}d\tilde{r}$, which can be written as:

$$u(\tilde{r}) = \O_o h(r_o)\frac{r_0}{\tilde{r}}\left(\frac{d\tilde{r}}{dr_o}\right)^{-1}. \quad \text{Equation (11)}$$

where $\O_o$ is the initial solute concentration and $u(\tilde{r})$ is the drying pattern deposit density.

The solute precipitation condition $\tilde{r}(r_o,t_d)=R(t_d)$ at time $t_d$, Equation (9) gives rise to the following relation:

$$\tilde{r}(r_o, t_d) = R(t_d) = r_o^{\frac{1}{1+k_{cl}-G}} R_o^{\frac{k_{cl}-G}{1+k_{cl}-G}}. \quad \text{Equation (12)}$$

Figure 6:
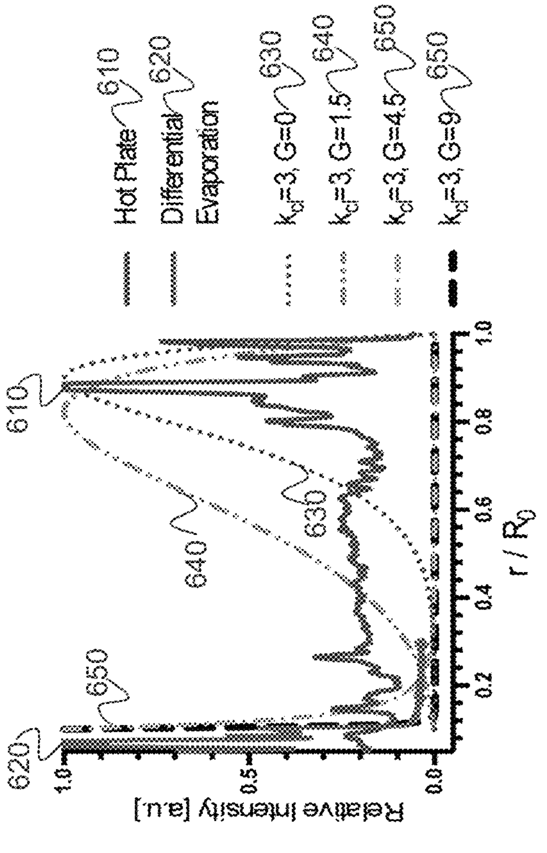
FIG. 6 depicts an example of model fitting of a drying pattern analytical solution to drying patterns of laser-induced differential evaporation and hot plate heating, in accordance with some example embodiments.

Substituting Equation (12) into Equation (11), the drying pattern deposit density may be determined as:

$$u(\tilde{r}) = \O_o H_o(1 + k_{cl} - G)\left(\frac{\tilde{r}}{R_o}\right)^{2[k_{cl}-G]}\left[1 - \left(\frac{\tilde{r}}{R_o}\right)^{2(1+k_{cl}-G)}\right], \quad \text{Equation (13)}$$

where $H_o$ is the initial droplet height at t=0. In FIG. 6, $$\frac{u(\tilde{r})}{\O_o H_o}$$

is normalized to its maximum value and plotted against $$\frac{\tilde{r}}{R_o}$$

to show changes of drying pattern deposit density from center to edge of the initial droplet.

FIG. 6 depicts an example of fitting a drying pattern analytical solution to drying patterns of laser-induced differential evaporation and hot plate heating. Solute densities are normalized to their respective maximum values. The droplet volume is assumed to decrease much faster than the equilibration of the contact angle ($K_{ev}$>>1). $k_{cl}$ is a time-independent material parameter that is determined by the droplet and the substrate. G is related to laser-induced evaporation rate P(t) by Equation (10). For all cases, material parameter $k_{cl}$=3. For G=0 (purple curve), the analytical solution closely matches to the drying pattern of hot plate heating, a characteristic coffee-ring. For G=4.5 (orange curve), the analytical solution closely matches to the drying pattern of laser-induced differential evaporation, a characteristic center peak.

Because DNA concentration was enriched from its initial concentration of 10 nM and the heated evaporations (laser and hot plate) occurred faster than natural drying, K>>1. To fit the drying pattern of hot-plate hitting, the material parameter $k_{cl}$=3 may be chosen. The result shows the coffee-ring effect. By increasing the laser-induced evaporation rate to increase the value of C, the deposit peak moves toward the droplet center. At G=4.5, the drying pattern shape shifts from coffee-ring to center peak pattern, in agreement with the observed drying pattern of laser-induced differential evaporation. Therefore, experimental results about laser power dependence on the droplet size are agreed with a possible model.

In light of the above features, the disclosed technology can be implemented to use a low power, scalable $CO_2$ laser setup to produce differential evaporation over a droplet to mitigate the coffee-ring effect without any surfactants or additives. As the droplet dries, the solutes precipitate within a predefined area at the center of the droplet. The disclosed technology allows enrichment and focused deposition of water-soluble molecules, and has potential to substantially advance the technologies in combinational liquid biopsy analysis, ink-jet printing, and microarray fabrication.

An example droplet spotting system setup is now described. Fluorescent DNA molecules may be diluted in Milli-Q water and spotted using the integrated syringe pump system. The system includes a programmable syringe pump (NE-1000, New Era Pump System) mounted with a 1 mL plastic syringe (Tuberculin Syringe, Becton Dickinson). The syringe tip may be connected to a #27 gauge, stainless metal tip dispensing needle (I.D. 210 μm) via plastic mount and then extended with a 30 cm segment of Tygon tubing before interfacing with a #27 gauge stainless metal tip removed of its plastic stage. For precise displacement control, stainless metal tip at the end of tubing was fixed onto a probe holder integrated to an XYZ linear stage.

An example cytop microarray fabrication is now described. A cytop microarray may be patterned with cytop polymer (e.g., Asahi Glass Co., Japan) on 75×50×1 mm glass slides (Thermo Fisher Scientific, USA). Before cytop coating, the glass slide was solvent-cleaned and dried. Cytop polymer type A, containing carboxyl end functional group, was used for coating. 0.05% of (3-aminopropyl) triethoxysilane (e.g., Sigma Aldrich, USA) in ethanol/water (95/5) mixture were spin-coated on glass to promote cytop adhesion. A 4.5 μm thick cytop polymer layer was formed on glass by spin-coating 9% cytop type A solution at 800 rpm for 30 s and cured at standard cytop curing condition. To promote photoresist adhesion, cytop surface was oxygen plasma treated in a microwave plasma system (PS100, PVA Tepla) at 2.45 GHz frequency, gas flow rate of 120 sccm, and power of 200 W for 60 s. Using conventional photolithography method, a 5 μm thick negative tone photoresist NR-9 6000PY (Futurrex, USA) was spin-coated onto the cytop-coated glass and patterned with 100 μm circular opening to cytop surface. 100 μm well patterns on photoresist were transferred onto the cytop coating by oxygen plasma etching (Plasmalab 80 plus system, Oxford Instruments) the exposed cytop surface. After complete etching of cytop surface, the remaining photoresist was removed by immersion in resist remover (RR41, Futurrex).

Deposition pattern imaging and analysis. Fluorescent DNA drying pattern on cytop-coated microarray devices may be imaged using an enclosed inverse fluorescent microscope (e.g., BZ-9000, Keyence Corporation) at either 5× or 20× magnification depending on the pattern size. The samples were excited by a mercury lamp through a single-band bandpass filter (472.5/30 nm), and the emission light was filtered by another single-band bandpass filter (520/35 nm). Both pattern size and capture ratio analysis were implemented using the ImageJ software. To estimate for the pattern size, ferret diameter of the best-fitting elliptical shapes to the fluorescent DNA pattern was calculated and used. To calculate the "capture ratio" for any given pattern, the integrated fluorescent intensity within the 100 μm microarray pattern was divided by the total integrated fluorescent intensity of the image. Accordingly, the apparatus may achieve a beam waist of laser (e.g., CO2 laser) to be between 25 and 35 microns.

The laser beam is further characterized below. The diffraction limited beam spot, $D_{fp}$, can be calculated from the equation $$D_{fp} = \frac{2\lambda}{\pi \times N.A.}$$

where λ is the laser wavelength and N.A. is the numerical aperture of an optical setup. In our system $$N.A. = \frac{D_{beam}}{2f},$$

where $D_{beam}$ is the laser beam size entering the final plano-convex lens and f is the focal length. Given our laser wavelength, beam size, and focal length being λ=10.6 μm, $D_{beam}$=1", and f=50 mm, the diffraction limit of a focused CO2 laser beam in our setup is 26.6 μm. Table 2 at FIG. 9 shows the relationship between the observed beam size and distance from focal point to the final plano-convex lens' holder. Beam size was characterized by measuring the incandescent surface area of a 500 μm thick glass substrate. When focusing the laser onto the glass surface, the surface generated incandescence when a critical energy density was reached. During the laser beam size characterization, the circular coverslip attenuator was removed to allow higher energy density. As the distance between glass surface and lens holder approached 46 mm, power required to reach incandescence reduces until a minimal beam size of 28.93 μm was achieved. Overall, we have established a CO2 laser system that enables precise control of differential evaporation onto liquid sample surface at a spatial resolution of 28.93 μm.

Verification of key assumptions. The following conditions on droplet geometry and evaporation rate may be satisfied:

$$\text{Droplet height profile: } h(r,t) = H(t)\left[1 - \frac{r^2}{R^2(t)}\right], \quad \text{Equation (14)}$$

$$\text{Overall evaporation rate: } \dot{V} = \dot{V}_o\left(\frac{R(t)}{R_o}\right). \quad \text{Equation (15)}$$

In Equation (14), the droplet height profile h(r,t) follows a parabolic curve described by its center height H(t) and contact radius R(t) at time t. To verify Equation (14), droplet volume from both parabolic height profile estimation, and its exact volume described by spherical profile were compared:

Estimated droplet volume from parabolic profile:

$$V(t) = \frac{\pi}{2} H(t)R^2(t), \quad \text{Equation (16)}$$

Exact droplet volume from spherical profile:

$$V(t) = \frac{\pi}{6} H(t)[3 * R^2(t) + H(t)^2]. \quad \text{Equation (17)}$$

Figure 7:
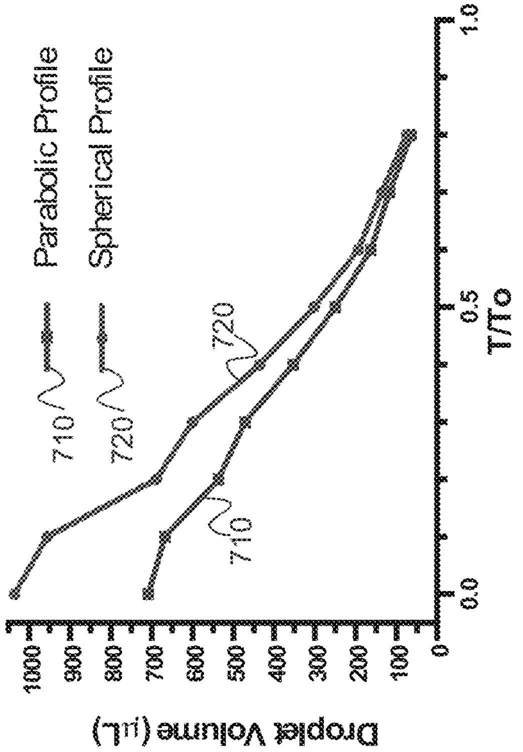
FIG. 7 depicts an example of estimated droplet volume from parabolic profile vs. exact droplet volume from spherical profile of drying droplets (n=3) during laser-induced differential evaporation.

In FIG. 7, estimated (Equation 16) and exact droplet volumes (Equation 17) of drying droplets (n=3) during laser-induced differential evaporation were calculated and plotted. While the parabolic and spherical droplet volume differs initially, the two curves converge rapidly after 0.3 $T/T_0$. Convergence of the two curves indicates agreement between actual droplet geometry and mathematical approximation. Therefore, Equation 14 applies to our empirical results when $T/T_0>0.3$.

Figure 8:
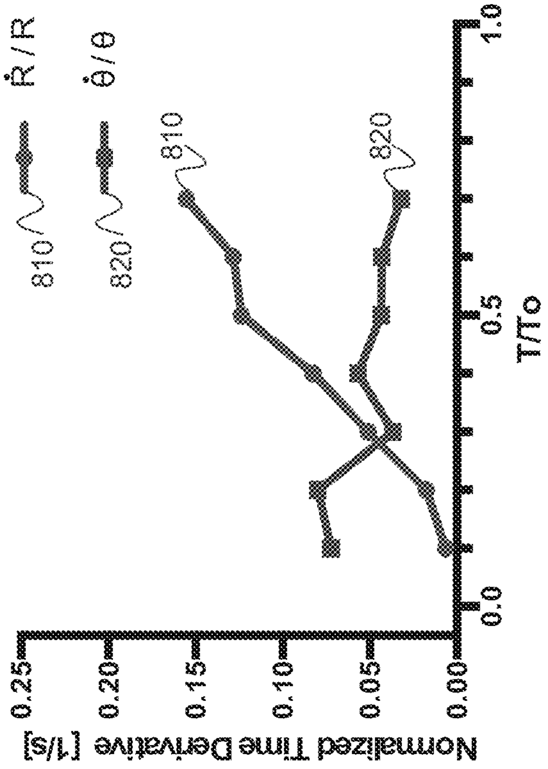
FIG. 8 depicts $\dot{R}/R$ and $\dot{\theta}/\theta$ for of drying droplets (n=3) during laser-induced differential evaporation.

In Equation 15, the overall evaporation rate V is a linear function of initial evaporation rate $\dot{V}_o$, R (t), and initial contact radius $R_o$.2,3 Equation 15 is valid when the $\dot{V}$ is proportional to contact radius R (t) and independent of contact angle θ, which can be describe by the following condition:

$$\frac{\dot{R}}{R} > \frac{\dot{\theta}}{\theta}, \quad \text{Equation (18)}$$

where $\dot{R}$ is the contact radius time derivative and $\dot{\theta}$ is contact angle time derivative. In FIG. 8, absolute values of $$\frac{\dot{R}}{R} \text{ and } \frac{\dot{\theta}}{\theta}$$

of drying droplets (n=3) during laser-induced differential evaporation were calculated and plotted. At $$T/T_0 = 0.3,$$

$$\frac{\dot{R}}{R}$$

outpaces and continues to increase $$\frac{\dot{\theta}}{\theta}$$

while $$\frac{\dot{\theta}}{\theta}$$

continues to decrease. When the condition set forth in Equation 18 is true, droplet evaporation can be contributed mainly to contact radius change and thus Equation 15 is also true. Therefore, Equation 15 applies to our results when $T/T_0>0.3$.

Derivation of analytic solution for drying pattern of laser-induced differential evaporation. Given Eqs. 14-15 are valid approximation for laser-induced differential evaporation process, $\dot{R}$ can be found. When applied to Stokesian hydrodynamics, the principle is equivalent to minimization in energy dissipation, which is defined by the Rayleighian $\mathfrak{R} = \Phi + \dot{F}$, and the Onsager principle4 here is defined as:

$$\frac{\partial(\Phi + \dot{F})}{\partial \dot{R}} = 0, \quad \text{Equation (19)}$$

where $\dot{F}$ is the time derivative of the free energy of the system and Φ is the energy dissipation function. Define $$\theta_e = \sqrt{\frac{2(\gamma_{LS} + \gamma_{LV} - \gamma_{SV})}{\gamma_{LV}}}$$

as the equilibrium contact angle:

$$\dot{F} = \gamma_{LV}\left\{\left[\frac{-16V^2}{\pi R^5} + \pi R\theta_e^2\right]\dot{R} + \frac{8V\dot{V}}{\pi R^4}\right\}, \quad \text{Equation (20)}$$

$$\Phi = \left[\frac{1}{2}\int_0^R dr 2\pi r \frac{3\eta}{h} v^2\right] + \pi\zeta_{cl} R\dot{R}^2, \quad \text{Equation (21)}$$

where $\gamma_{LV}$ is the liquid-vapor interfacial energy density, ν is height averaged fluid velocity (ν>0 for outward flow and ν<0 for inward flow), and $\zeta_{cl}$ is inverse of mobility of the contact line ($\zeta_{cl}\rightarrow\infty$ if pinned contact line, $\zeta_{cl}\rightarrow 0$ if free moving contact line). Defining the solvent mass conservation equation (sign of the velocity: positive for leaving the center, negative towards the center):

$$\frac{d}{dt}\int_0^r dr' 2\pi r' h(r', t) = -2\pi r v(r, t) h(r, t) - \int_0^r dr' 2\pi r' J(r', t) \qquad \text{Equation (22)}$$

The evaporation flux J(r,t) [Vol/s−area] can be represented as the sum of two components:

$$J(r,t) = J_i + J_d, \qquad \text{Equation (23)}$$

where $J_i$ is the evaporation rate due to isothermal evaporation because of laser heating, and $J_d$ is the differential evaporation by the focused laser beam. From the measured temperature profile of the droplet under the focused CO2 laser beam and the fact that laser-induced evaporation dries the droplet 10 times faster than the uniformly heated droplet (to 50 C) by a hot plate, we can assume that $J_d >> J_i$ and the evaporation flux can be approximated as $$J(r, t) \sim J_i \cong 0 \quad r > a \qquad \text{Equation (24)}$$

$$J(r, t) \sim J_d = \frac{P}{\pi a^2} \quad r < a$$

where α is the radius of the laser selected area. P is the laser-induced evaporation flux and is proportional to the droplet surface temperature in the laser irradiated area.

In our case, we only consider the case r>a to remove the coffee-ring effect outside the laser spot. In a droplet with r>a, from Eqs. 22-10, $$\int_0^r dr' 2\pi r' J(r', t) = P. \qquad \text{Equation (25)}$$

From Eqs. 22 and 25, $$\frac{d}{dt}\int_0^r dr' 2\pi r' h(r', t) = -2\pi r v(r, t) h(r, t) - P. \qquad \text{Equation (26)}$$

Each term in Equation 26 can be represented as below:

$$\frac{d}{dt}\int_0^r dr' 2\pi r' H(t)\left[1 - \frac{r'^2}{R^2(t)}\right] = \pi r^2 \dot{H} - \frac{\pi r^4}{2}\frac{d}{dt}\frac{H}{R^2} = \pi r^2 \dot{H} - \frac{\pi r^4}{2}\frac{\dot{H}}{R^2} + \frac{2\pi r^4}{2}\frac{H}{R^3}\dot{R},$$

$$2\pi r v(r, t) h(r, t) = 2\pi r H(t)\left[1 - \frac{r^2}{R^2(t)}\right] v.$$

Substitute all the above into Equation 26 to derive Equation 27

$$\pi r^2 \dot{H} - \frac{\pi r^4}{2}\frac{\dot{H}}{R^2} + \frac{2\pi r^4}{2}\frac{H}{R^3}\dot{R} = -2\pi r H(t)\left[1 - \frac{r^2}{R^2(t)}\right] v - P \qquad \text{Equation (27)}$$

$$2\pi r H(t)\left[1 - \frac{r^2}{R^2(t)}\right] v + P = -\pi r^2 \dot{H} + \frac{\pi r^4}{2}\frac{\dot{H}}{R^2} - \frac{2\pi r^4}{2}\frac{H}{R^3}\dot{R}$$

$$\text{Right-hand-side} = -\frac{\pi r^2 \dot{H}}{2}\left[2 - \frac{r^2}{R^2}\right] - \pi r^2 H \frac{\dot{R}}{R}\left(\frac{r^2}{R^2}\right)$$

-continued $$2\pi r H(t)\left[1 - \frac{r^2}{R^2(t)}\right] v = -\frac{\pi r^2 \dot{H}}{2}\left[2 - \frac{r^2}{R^2}\right] - \pi r^2 H \frac{\dot{R}}{R}\left(\frac{r^2}{R^2}\right) - P$$

$$2\pi r H(t) v = -\frac{\pi r^2 \dot{H}}{2}\left[1 + \frac{1}{\left(1 - \frac{r^2}{R^2}\right)}\right] + \pi r^2 H \frac{\dot{R}}{R}\left[1 - \frac{1}{\left(1 - \frac{r^2}{R^2}\right)}\right] - \frac{P}{\left[1 - \frac{r^2}{R^2}\right]}$$

Use the following relations:

$$V(t) = \frac{\pi}{2} H(t) R^2(t), \qquad \text{Equation (28)}$$

$$\dot{V} = \frac{\pi}{2}\dot{H}R^2 + \pi R H \dot{R},$$

$$\frac{\dot{V}}{V} = \frac{\frac{\pi}{2}\dot{H}R^2 + \pi R H \dot{R}}{\frac{\pi}{2}HR^2} = \frac{\dot{H}}{H} + \frac{2\dot{R}}{R};\ \frac{\dot{H}}{4H} = \frac{\dot{V}}{4V} - \frac{\dot{R}}{2R}. \qquad \text{Equation (29)}$$

We can represent v:

$$v = -\frac{r\dot{H}}{4H}\left[1 + \frac{1}{\left(1 - \frac{r^2}{R^2}\right)}\right] + \frac{r}{2}\frac{\dot{R}}{R}\left[1 - \frac{1}{\left(1 - \frac{r^2}{R^2}\right)}\right] - \frac{P}{2\pi r H\left[1 - \frac{r^2}{R^2}\right]}, \qquad \text{Equation (30)}$$

By reorganizing the terms, we obtain $$v = r\left[\frac{\dot{R}}{R} - \frac{\dot{V}}{4V}\right] - \frac{r}{\left(1 - \frac{r^2}{R^2}\right)}\frac{\dot{V}}{4V} - \frac{P}{2\pi r\left[1 - \frac{r^2}{R^2}\right]H}, \qquad \text{Equation (31)}$$

Substitute Equation 31 into Equation 21, $$\Phi = \left[\frac{1}{2}\int_0^R dr 2\pi r \frac{3\eta}{h}\left\{r\left[\frac{\dot{R}}{R} - \frac{\dot{V}}{4V}\right] - \frac{r}{\left(1 - \frac{r^2}{R^2}\right)}\frac{\dot{V}}{4V} - \frac{P}{2\pi r\left[1 - \frac{r^2}{R^2}\right]H}\right\}^2\right] + \pi\zeta_{cl} R \dot{R}^2. \qquad \text{Equation (32)}$$

$$\Phi = \frac{1}{2}\int_0^R dr 2\pi r^3 \frac{3\eta}{h}\left\{\left[\frac{\dot{R}}{R} - \frac{\dot{V}}{4V}\right]^2 - \frac{1}{\left(1 - \frac{r^2}{R^2}\right)^2}\frac{\dot{V}}{4V}\left[\frac{\dot{R}}{R} - \frac{\dot{V}}{4V}\right] + \frac{1}{\left(1 - \frac{r^2}{R^2}\right)^2}\left(\frac{\dot{V}}{4V}\right)^2\right\} -$$

-continued $$\left[\int_0^R dr\frac{3\eta}{h}\left\{r\left[\frac{\dot R}{R}-\frac{\dot V}{4V}\right]-\frac{r}{\left(1-\frac{r^2}{R^2}\right)}\frac{\dot V}{4V}\right\}\frac{P}{\left[1-\frac{r^2}{R^2}\right]H}\right]+\left[\frac{1}{2}\int_0^R dr\frac{1}{2\pi r}\frac{3\eta P^2}{H^3\left[1-\frac{r^2}{R^2(t)}\right]^3}\right]+\pi\zeta_{cl}R\dot R^2$$

To avoid singularity in energy dissipation at the contact line in 32, we use a molecular cutoff length to be in the order of $10^{-6}$R and define $$\epsilon=\lim_{r\to(1-10^{-6})R}\left(1-\frac{r^2}{R^2}\right)=2\times10^{-6}.$$

The first term in Equation 32 is $$\frac{1}{2}\int_0^R dr2\pi r^3\frac{3\eta}{h}\left\{\left[\frac{\dot R}{R}-\frac{\dot V}{4V}\right]^2-\frac{1}{\left(1-\frac{r^2}{R^2}\right)}\frac{\dot V}{2V}\left[\frac{\dot R}{R}-\frac{\dot V}{4V}\right]+\frac{1}{\left(1-\frac{r^2}{R^2}\right)^2}\left(\frac{\dot V}{4V}\right)^2\right\}=$$

$$\frac{3\pi^2\eta R^4}{4V}[-\ln(\epsilon)-1]\left(\dot R-\frac{R\dot V}{4V}\right)^2-\frac{3\pi^2\eta R^4}{4V}\left(\frac{R\dot V}{4V}\right)\left(\dot R-\frac{R\dot V}{4V}\right)\left[\frac{1}{\epsilon}+\ln\epsilon-1\right]+\frac{3\pi^2\eta R^4}{4V}\left(\frac{R\dot V}{4V}\right)^2\left[\frac{1}{2\epsilon^2}-\frac{1}{\epsilon}+\frac{1}{2}\right]$$

Also, the second term in Equation 32 is $$\left[\int_0^R dr\frac{3\eta}{h}\left\{r\left[\frac{\dot R}{R}-\frac{\dot V}{4V}\right]-\frac{r}{\left(1-\frac{r^2}{R^2}\right)}\frac{\dot V}{4V}\right\}\frac{P}{\left[1-\frac{r^2}{R^2}\right]H}\right]=$$

$$\frac{3\pi^2\eta R^4}{4V}\frac{PR^2}{2V}\left(\frac{\dot R}{R}-\frac{\dot V}{4V}\right)\left[\frac{1}{\epsilon}-1\right]-\frac{3\pi^2\eta R^4}{4V}\frac{PR^2}{4V}\left(\frac{\dot V}{4V}\right)\left[\frac{1}{\epsilon^2}-1\right]$$

The third term in Equation 32 is not expanded here since it does not have a $\dot{R}$ component and thus will not be contributing to our derivation of Equation 33.

Using Eqs. 19, 20, and 32, then $$\gamma_{LV}\left[\frac{-16V^2}{\pi R^5}+\pi R\theta_e^2\right]+\frac{3\pi^2\eta R^4}{2V}\left(\dot R-\frac{R\dot V}{4V}\right)[-\ln(\epsilon)-1]-\frac{3\pi^2\eta R^4}{4V}\left(\frac{R\dot V}{2V}\right)\left[\frac{1}{\epsilon}+\ln\epsilon-1\right]-\frac{3\pi^2\eta R^4}{4V}\frac{PR}{2V}\left[\frac{1}{\epsilon}-1\right]+2\pi\zeta_{cl}R\dot R=0 \quad \text{Equation (33)}$$

Using the approximation: $\dot{V}\sim-P$, Equation 33 can be written as $$\gamma_{LV}\left[\frac{-16V^2}{\pi R^5}+\pi R\theta_e^2\right]+\frac{3\pi^2\eta R^4}{2V}\left(\dot R-\frac{R\dot V}{4V}\right)[-\ln(\epsilon)-1]+\frac{3\pi^2\eta R^4}{4V}\left(\frac{RP}{2V}\right)[\ln\epsilon]+2\pi\zeta_{cl}R\dot R=0$$

Define $$C=[-\ln(\epsilon)-1]\sim12\left(1+\frac{4\pi\zeta_{cl}RV}{3\pi^2\eta R^4C}\right)\dot R-\left(\frac{RP}{4V}\right)\left(1+\frac{1}{C}\right)=\frac{R\dot V}{4V}+\frac{2V}{3\pi^2\eta CR^4}\gamma_{LV}\left[\frac{16V^2}{\pi R^5}=\pi R\theta_e^2\right], \quad \text{Equation (34)}$$

Use the relations:

$$\theta(t)=\frac{2H(t)}{R(t)}$$

and Equation 16, $$\frac{16V^2}{\pi R^5}=\frac{4\pi H^2}{R},\left[\frac{16V^2}{\pi R^5}-\pi R\theta_e^2\right]=\frac{4\pi H^2}{R}-\pi R\theta_e^2=\pi R(\theta^2-\theta_e^2)\frac{2V}{3\pi^2\eta CR^4}=\frac{\pi HR^2}{3\pi^2\eta CR^4}=\frac{\pi H}{3\pi^2\eta CR^2}=\frac{\theta}{6\pi\eta CR},$$

thus the 2nd term in the RHS of Equation 34 can be written as $$\frac{2V}{3\pi^2\eta CR^4}\gamma_{LV}\left[\frac{16V^2}{\pi R^5}=\pi R\theta_e^2\right]=\frac{\theta\gamma_{LV}}{6\eta C}(\theta^2-\theta_e^2)$$

Also the term in the LHS of Equation 34:

$$\frac{4\pi\zeta_{cl}RV}{3\pi^2\eta R^4C}$$

can be simplified as $$\frac{4\zeta_{cl}RV}{3\pi\eta R^4C}=\frac{\zeta_{cl}\theta}{3\eta C}\equiv k_{cl} \quad \text{Equation (35)}$$

As disclosed above, $k_{cl}$ denotes the ratio of contact line friction to hydrodynamic friction. Here, $k_{cl}$ can be assumed to be a time-independent material parameter that is determined by the droplet and the substrate.

We can simplify Equation 34 to $$(1+k_{cl})\dot R=\frac{R\dot V}{4V}+\frac{\gamma_{LV}}{6\eta C}\theta(\theta^2-\theta_e^2)+\left(\frac{RP}{4V}\right)\left(1+\frac{1}{C}\right), \quad \text{Equation (36)}$$

Consider solute at $r_o$ at t=0. As the solvent evaporates, such a solute is convected by the fluid. $\tilde{r}(r_o,t)$ is the height-averaged position of such a solute at t. Ignoring diffusion, solute moves at the same speed as the fluid as long as it is in the droplet (i.e. $\tilde{r}(r_o,t)<R(t)$). Hence, from Equation 31, $$\dot{(\tilde{r})}(r_o,t)=v[\tilde{r}(r_o,t),t]=\tilde{r}\left[\frac{\dot{R}}{R}-\frac{\dot{V}}{4V}\right]-\frac{\tilde{r}}{\left(1-\frac{\tilde{r}^2}{R^2}\right)}\frac{\dot{V}}{4V}-\frac{P}{2\pi\tilde{r}\left[1-\frac{\tilde{r}^2}{R^2}\right]H}.$$

Using the approximate relation: $P=\dot{V}$, the above equation can be written as $$\dot{(\tilde{r})}(r_o,t)=v[\tilde{r}(r_o,t),t]=\tilde{r}\left[\frac{\dot{R}}{R}-\frac{\dot{V}}{4V}\right]-\frac{P}{2\pi\tilde{r}H} \quad \text{Equation (37)}$$

To help simplifying our final expression, the following time scales and $K_{ev}$ may be used:

$$\tau_{ev}=\frac{|V_o|}{|\dot{V}_o|}=-\frac{V_o}{\dot{V}_o},\ \tau_{re}=\frac{\eta V_0^{\frac{1}{3}}}{\gamma_{LV}\theta_e^3},\ K_{ev}=\frac{\tau_{re}}{\tau_{ev}}. \quad \text{Equation (38)}$$

where $\tau_{ev}$ represents the characteristic time for the droplet to dry completely and $\tau_{re}$ represents the characteristic time to relax to its equilibrium contact angle. Assume $K_{ev}>>1$ for concentrated polymer (i.e. high viscosity due to enrichment) or strong laser enhanced evaporation effect (i.e. $K_{ev}>>1$). Equation 36 can be approximated as $$\dot{R}\sim\frac{R\dot{V}}{4(1+k_{cl})V}+\frac{RP}{4V(1+k_{cl})}\left(1+\frac{1}{c}\right), \quad \text{Equation (39)}$$

$$\frac{\dot{V}}{4V}=(1+k_{cl})\frac{\dot{R}}{R}-\frac{P}{4V}\left(1+\frac{1}{c}\right) \quad \text{Equation (40)}$$

From Eqs. 38 and 40, for $\tilde{r}>a$, we can write Equation 37 as:

$$\dot{(\tilde{r})}(r_0,t)=v[\tilde{r}(r_0t),t]=-k_{cl}\tilde{r}(r_0,t)\frac{\dot{R}}{R}+\frac{\tilde{r}P}{4V}\left(1+\frac{1}{c}\right)-\frac{P}{2\pi\tilde{r}H} \quad \text{Equation (41)}$$

for $\tilde{r}>a$, $$\frac{\dot{(\tilde{r})}}{\tilde{r}}(r_0,t)=-k_{cl}\frac{\dot{R}}{R}+\frac{P}{4V}\left(1+\frac{1}{c}\right)-\frac{P}{2\pi\tilde{r}^2H},$$

$$\frac{\dot{(\tilde{r})}}{\tilde{r}}(r_0,t)=-k_{cl}\frac{\dot{R}}{R}-\frac{P}{2\pi H}\left[\frac{1}{\tilde{r}^2}-\frac{1}{R^2}\left(1+\frac{1}{c}\right)\right], \quad \text{Equation (42)}$$

Note that because of the negative sign in front of the $$\frac{\dot{R}}{R}$$

term, the solute moves in the opposite rate as the droplet when the laser induced evaporation rate is turned off, revealing the coffee-ring effect. The greater is the coefficient $k_{cl}$ that is related to liquid viscosity and contact line friction, the more serious the coffee-ring effect becomes. However, when the laser-induced evaporation is set at an appropriate level (to be determined next), and provided the solute at position $r_o$ initially (t=0) precipitates at $t=t_d$ at droplet edge ($\tilde{r}(r_o,t_d)=R$), the velocity of solute ($\dot{\tilde{r}}(r_o,t_d)$) can be in the same direction as $\dot{R}$ but at a higher magnitude, yielding a condition that contradicts the presumption that the solute precipitates at the edge of the droplet. Therefore, when the laser induced differential evaporation rate reaches an appropriate level, solute with its initial position $r_o$ will not precipitate at the edge of the droplet, thus removing the coffee-ring effect.

Since Equation 42 is a function of the laser-induced evaporation rate P(t), we can design P(t) to approximately yield the following solution that will produce the deposition pattern to be discussed next:

$$\tilde{r}(r_0,t)=r_0\left(\frac{R}{R_0}\right)^{-[k_{cl}-G]}, \quad \text{Equation (43)}$$

with $r_o$ being the initial solute position (at t=0) within the droplet and $\tilde{r}$ being the solute position at time "t". Inserting Equation 43 into Equation 42, we can obtain $$GR\dot{R}=-\frac{P}{2\pi H}\left[\frac{R^2}{\tilde{r}^2}-\left(1+\frac{1}{c}\right)\right], \quad \text{Equation (44)}$$

$$\text{since } \frac{R^2}{\tilde{r}^2}=\frac{R^2}{r_0^2}\frac{R_0^{2[G-k_{cl}]}}{R^{2[G-k_{cl}]}}$$

$$GR\dot{R}=-\frac{P}{2\pi H}\left[\frac{R^2}{r_0^2}\frac{R_0^{2[G-k_{cl}]}}{R^{2[G-k_{cl}]}}-\left(1+\frac{1}{c}\right)\right].$$

By choosing $G>>k_{cl}+1$ to remove coffee-ring and keeping in mind that $GR\dot{R}<0$ since $\dot{R}<0$, then $$GR\dot{R}\sim-\frac{P}{2\pi H}\left[\frac{R^2}{r_0^2}\frac{R_0^{2[G-k_{cl}]}}{R^{2[G-k_{cl}]}}-\left(1+\frac{1}{c}\right)\right]\sim-\frac{P}{2\pi H}\left[\frac{R^2}{r_0^2}\frac{R_0^{2[G-k_{cl}]}}{R^{2[G-k_{cl}]}}\right]. \quad \text{Equation (45)}$$

To assure that $$\frac{R^2}{r_0^2}\frac{R_0^{2[G-k_{cl}]}}{R^{2[G-k_{cl}]}}\gg\left(1+\frac{1}{c}\right),$$

we must have $$\left(\frac{R_0}{R}\right)^{2(G-k_{cl}-1)}\gg\left(1+\frac{1}{c}\right)$$

and thus we can set a condition for G in Equation 43 as $$G>k_{cl}+1+\frac{\ln 1.08}{2\ln\left(\frac{R_0}{R}\right)}. \quad \text{Equation (46)}$$

While $R\rightarrow R_0$ leads to $G\rightarrow\infty$, please note that our parabolic volume profile is only valid for timeframe $T/T_0>0.3$. From FIG. 3, In $$\frac{R_0}{R} > 0.15 \text{ at } T/T_0 = 0.4,$$

and thus $G>k_{cl}+1.27$. To prevent the solute that is initially located at ro from precipitation, we set the laser-induced evaporation rate to satisfy the following condition:

$$P(t) > -GR\dot{R}(2\pi H)\left(\frac{R}{R_0}\right)^{2(G-k_{cl}-1)}\left(\frac{r_0^2}{R_0^2}\right)$$

Since $r_o \le R_o$ and $R \le R_o$, we can safely set the laser power to be the following to assure that the real solution of Equation 45 is bounded by the expression of Equation 43.

$$P(t) > -GR\dot{R}(2\pi H) = GH\frac{d}{dt}(\pi R^2) \quad \text{Equation (47)}$$

Assume the solute eventually precipitates at position $\tilde{r}(r_o,t_d)=R(t_d)$, from Equation 43, $$\tilde{r}(r_0, t_d) = R(t_d) = (r_0)^{\frac{1}{1+k_{cl}-G}}(R_0)^{\frac{k_{cl}-G}{1+k_{cl}-G}}. \quad \text{Equation (48)}$$

Inserting Equation 48 into the expression of drying pattern deposit density, $$u(\tilde{r}(r_0, t)) = h(r_0, 0)\varnothing_0\frac{r_0}{\tilde{r}}\left(\frac{d\tilde{r}}{dr_0}\right)^{-1}, \quad \text{Equation (49)}$$

where $\varnothing_o$ is initial solute concentration (at t=0, $R=R_o$) and $H_o$ is the initial droplet height at t=0, and representing $r_o$ in terms of $\tilde{r}$, Equation 49 becomes $$u(\tilde{r}) = \varnothing_0 H_0(1 + k_{cl} - T)\left(\frac{\tilde{r}}{R_0}\right)^{2[k_{cl}-G]}\left[1 - \left(\frac{\tilde{r}}{R_0}\right)^{2[1+k_{cl}-G]}\right], \quad \text{Equation (50)}$$

which is our final solution for drying pattern of laser-induced differential evaporation.

FIG. 7 depicts an example of estimated droplet volume from parabolic profile vs. exact droplet volume from spherical profile of drying droplets (n=3) during laser-induced differential evaporation.

FIG. 8 depicts $\dot{R}/R$ and $\dot{\theta}/\theta$ for of drying droplets (n=3) during laser-induced differential evaporation.

Table 2 in FIG. 9 depicts an example of observed beam size vs. distance to lens.

Based on the description herein, an apparatus that is suitable for causing microdroplet evaporation may be implemented to include a light source, a substrate to hold a microdroplet at a location, and a focusing module to focus the light source at an apex of the microdroplet, wherein a beam waist of the focused light source has a diameter less than a diameter of the microdroplet. For example, microdroplets may have a diameter of less than 100 micrometers. For example, beam waist may represent the narrowest beam width during the operation. The focusing apparatus may be designed and controlled to achieve this beam waist for the microdroplet evaporation apparatus.

For example, the focusing module may be implemented using an attenuated laser and as described with reference to FIGS. 1A-1C. For example, the plano-convex lens 130 or another suitable light focusing mechanism, e.g., an alignment microscope as depicted in FIG. 1A, may be used for implementing the focusing module. In some implementation, the focusing module causes illumination by the light source of a plurality of wells including the well at the same time or nearly the same time.

In some embodiments, e.g., described in FIGS. 1A-1C, the apparatus further includes an x-y mechanical translation apparatus configured to selectively translate the substrate to one of a plurality of wells with corresponding microdroplets including the well. For example, the microarray depicted in FIG. 1C may be used for providing the mechanical translation. For example, the alignment microscope may be used to correctly align with the microdroplet. As further described in the present document, the apparatus causes a drying of the microdroplet leaving a deposition of solids that were previously dissolved in the microdroplet before the microdroplet was dried. The deposition of solids is uniform or nearly-uniform (e.g., within 10% tolerance) across the dried microdroplet.

As disclosed in the present document, the apparatus may further include the following features:

In some embodiments, the microdroplet evaporation apparatus causes a drying of the microdroplet leaving a deposition of solids that were previously dissolved in the microdroplet before the microdroplet was dried.

In some embodiments, the deposition of solids is approximately the same size as the microdroplet.

In some embodiments, the deposition of solids includes deposition of water-soluble molecules including one or more of nucleic acids, proteins, inks, and other small molecules.

In some embodiments, the light source is a laser.

In some embodiments, the laser is a CO2 laser.

In some embodiments, the beam waist of the CO2 laser is approximately 25-35 microns.

In some embodiments, a beam of the CO2 laser is focused on the apex of the microdroplet to generate a differential evaporation.

In some embodiments, a differential evaporative flux profile has a maximum at the apex of the microdroplet.

In some embodiments, the beam focused at the apex of the microdroplet causes a uniform or nearly uniform deposition of solids when the microdroplet is dried. 14. The microdroplet evaporation apparatus of claim 1, wherein the microdroplet is an aqueous solution droplet with a droplet diameter of between 100 μm and 1.5 mm.

In some embodiments, the well is approximately 100 μm in diameter.

In some embodiments, the microdroplet has a volume between 1-10 microliters.

Based on the description herein, a method of evaporating a microdroplet may be performed to include: holding, by a substrate, a microdroplet at a location, illuminating, by a light source, the microdroplet, and focusing the light source at an apex of the microdroplet to cause a drying of the microdroplet, wherein a beam waist of the focused light source has a diameter less than a diameter of the microdroplet.

In some embodiments, the drying of the microdroplet leaves a deposition of solids that were previously dissolved in the microdroplet before the microdroplet was dried. In some embodiments, the deposition of solids is uniform or nearly uniform across the dried microdroplet.

With respect to the above described apparatus and method, in some embodiments, the deposition of solids includes deposition of water-soluble molecules including one or more of nucleic acids, proteins, inks, and other small molecules.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A microdroplet evaporation apparatus, comprising:

a light source;

a substrate to hold a microdroplet at a location; and a focusing module structured to cause an evaporative flux at an apex of the microdroplet that is greater than another evaporative flux at an edge of the microdroplet, wherein the focusing module focuses the light source on the microdroplet.

2. The microdroplet evaporation apparatus of claim 1, wherein the focusing module causes illumination by the light source of a plurality of locations including the location at the same time or nearly the same time.

3. The microdroplet evaporation apparatus of claim 1, further comprising:

an x-y mechanical translation apparatus configured to selectively translate the substrate to one of a plurality of locations with corresponding microdroplets including the location.

4. The microdroplet evaporation apparatus of claim 1, wherein the microdroplet evaporation apparatus causes a drying of the microdroplet leaving a deposition of solids that were previously dissolved in the microdroplet before the microdroplet was dried.

5. The microdroplet evaporation apparatus of claim 4, wherein the deposition of solids is uniform or nearly uniform across the dried microdroplet.

6. The microdroplet evaporation apparatus of claim 4, wherein the deposition of solids is approximately the same size as the microdroplet.

7. The microdroplet evaporation apparatus of claim 4, wherein the deposition of solids includes deposition of water-soluble molecules including one or more of nucleic acids, proteins, inks, and other small molecules.

8. The microdroplet evaporation apparatus of claim 1, wherein the light source is a laser.

9. The microdroplet evaporation apparatus of claim 1, wherein the laser is a $CO_2$ laser.

10. The microdroplet evaporation apparatus of claim 9, wherein the beam waist of the $CO_2$ laser is approximately 25-35 microns.

11. The microdroplet evaporation apparatus of claim 9, wherein a beam of the $CO_2$ laser is focused on the apex of the microdroplet to generate a differential evaporation.

12. The microdroplet evaporation apparatus of claim 11, wherein a differential evaporative flux profile has a maximum at the apex of the microdroplet.

13. The microdroplet evaporation apparatus of claim 12, wherein the beam focused at the apex of the microdroplet causes a uniform or nearly uniform deposition of solids when the microdroplet is dried.

14. The microdroplet evaporation apparatus of claim 1, wherein the microdroplet is an aqueous solution droplet with a droplet diameter of between 100 μm and 1.5 mm.

15. The microdroplet evaporation apparatus of claim 1, wherein a well approximately 100 μm in diameter is positioned at the location.

16. The microdroplet evaporation apparatus of claim 1, wherein the microdroplet has a volume between 1-10 microliters.

17. A method of evaporating a microdroplet, comprising:

holding, by a substrate, a microdroplet at a location;

illuminating, by a light source, the microdroplet; and causing an evaporative flux at an apex of the microdroplet that is greater than another evaporative flux at an edge of the microdroplet, wherein the focusing module focuses the light source on the microdroplet.

18. The method of evaporating a microdroplet of claim 17, wherein the drying of the microdroplet leaves a deposition of solids that were previously dissolved in the microdroplet before the microdroplet was dried.

19. The method of evaporating a microdroplet of claim 18, wherein the deposition of solids is uniform or nearly uniform across the dried microdroplet.

20. The method of evaporating a microdroplet of claim 18, wherein the deposition of solids includes deposition of water-soluble molecules including one or more of nucleic acids, proteins, inks, and other small molecules.

* * * * *